United States Patent [19]
Mimura

[11] Patent Number: 5,577,423
[45] Date of Patent: Nov. 26, 1996

[54] DIFFERENTIAL GEAR

[76] Inventor: Kenji Mimura, 29-1105, Wakabadai 4-chome, Asahi-ku, Yokohama, Kanagawa-ken, 241, Japan

[21] Appl. No.: 396,210

[22] Filed: Feb. 28, 1995

[30] Foreign Application Priority Data

| Mar. 4, 1994 | [JP] | Japan | 6-034783 |
| Jun. 17, 1994 | [JP] | Japan | 6-135978 |
| Jul. 29, 1994 | [JP] | Japan | 6-178801 |

[51] Int. Cl.$^6$ ............................ F16H 13/04; F16H 13/08
[52] U.S. Cl. ........................... 74/650; 475/196; 476/36
[58] Field of Search ............... 74/650; 475/183, 475/196; 476/36

[56] References Cited

U.S. PATENT DOCUMENTS

| 2,841,036 | 7/1958 | Decker | 74/650 |
| 5,312,306 | 5/1994 | Folino | 475/196 |
| 5,321,988 | 6/1994 | Folino | 475/196 X |

FOREIGN PATENT DOCUMENTS

| 2346611 | 12/1977 | France | 74/650 |
| 801421 | 1/1951 | Germany | 74/650 |
| 59-133863 | 8/1984 | Japan | 475/196 |
| 60-168954 | 9/1985 | Japan | 475/196 |
| 658344 | 4/1979 | U.S.S.R. | 475/196 |
| 1218215 | 3/1986 | U.S.S.R. | 475/196 |
| 1240980 | 6/1986 | U.S.S.R. | 475/196 |
| 1368545 | 1/1988 | U.S.S.R. | 475/196 |
| 1511495 | 9/1989 | U.S.S.R. | 475/196 |
| 1737191 | 5/1992 | U.S.S.R. | 476/36 |
| 1744347 | 6/1992 | U.S.S.R. | 476/36 |
| 94/29617 | 12/1994 | WIPO | 475/196 |

*Primary Examiner*—Charles A. Marmor
*Assistant Examiner*—Nathan O. Jensen
*Attorney, Agent, or Firm*—Lowe, Price, LeBlanc & Becker

[57] ABSTRACT

A small, inexpensive, comparatively simple differential gear having reliable revolution difference restricting effects includes a rotary casing and a retainer having a common rotation axis. Torque is transmitted to a groove of a pair of rotary members via rolling elements so the rotary members rotate with the casing. When a revolution difference occurs between the rotary members, rolling elements retained in guide slots of the retainer roll along the grooves of the rotary members so there is reciprocal movement within the range of the guide slots. When a force causing a revolution difference between the rotary members is applied from the side of only one of the rotary members, the resulting reaction force restricts the revolution difference between the pair of rotary members. This is because the rolling elements which come to the following side when the revolution difference exists trail the groove which comes to the leading side when a revolution difference occurs in response to their own movements. Reliable torque-sensitive revolution difference restricting effects are provided without a special mechanism to obtain a revolution difference restricting effect.

11 Claims, 26 Drawing Sheets

F I G. 26
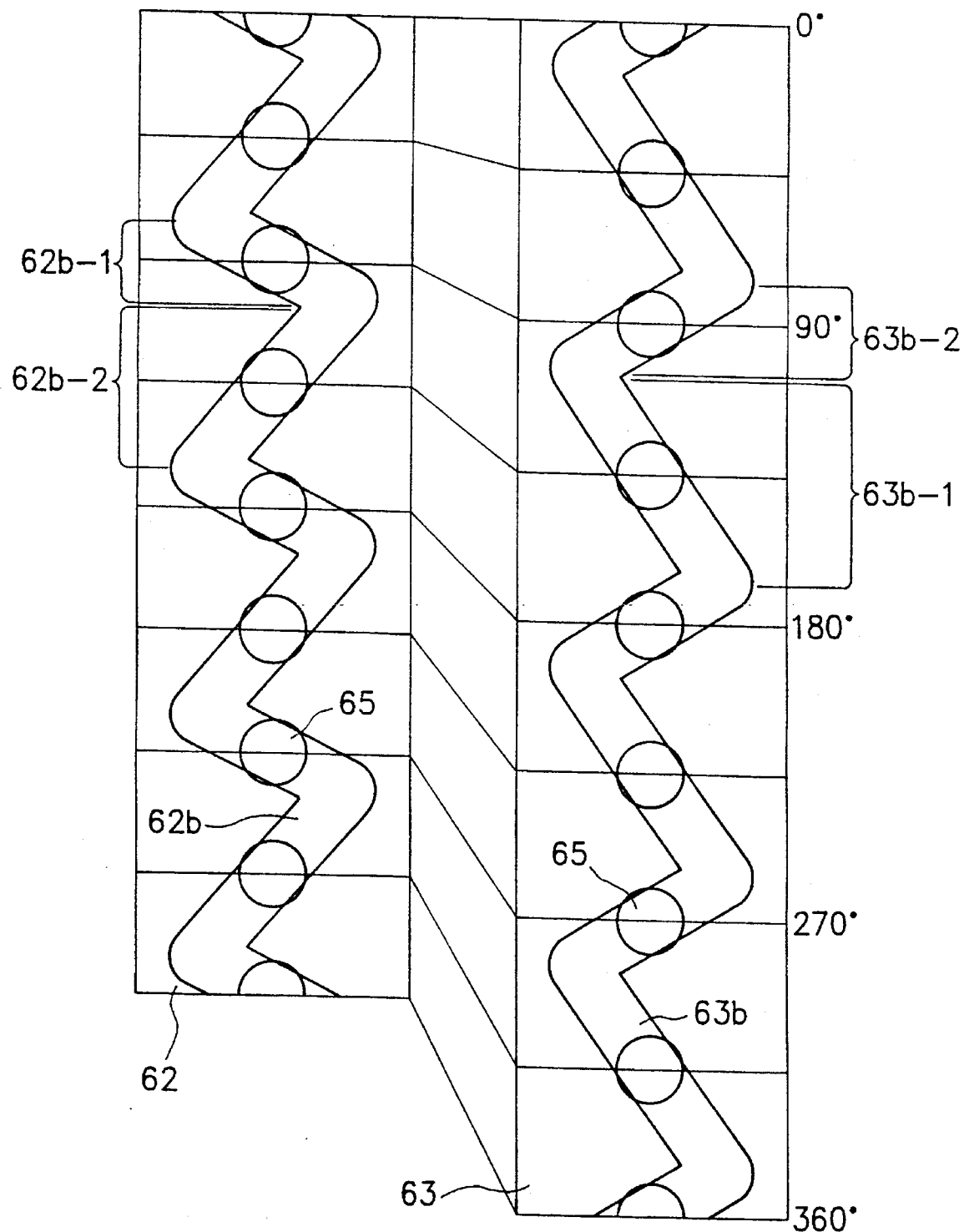

DIFFERENTIAL GEAR

FIELD OF THE INVENTION

This invention is of a differential gear that allows revolution difference between the left-hand and right-hand driving wheels or between the front and rear driving wheels of a vehicle and, in particular, of a differential gear equipped with a revolution difference limiting function.

DESCRIPTION OF THE PRIOR ART

A differential gear of a vehicle is a mechanism permitting revolution difference between the left-hand and right-hand driving wheels or between the front and rear driving wheels for four-wheel drive vehicles and it is a gear train consisting of a pinion gear being engaged between a pair of bevel gears connecting to the output shaft and when a torque is transmit to the pinion gear shaft from outside, said pinion gear starts autorotation when revolution difference occurs thus permitting one output shaft to revolve faster than the other.

Nevertheless, when one of the driving wheels only enters a surface area where the friction factor is extraordinarily small, such as on the snowy ground or sandy surface, said driving wheel only slips by the function of the differential gear losing the overall driving force and the vehicle more probably gets trapped at said spot.

When a vehicle travels on a curve at a high speed, if the load on the inner wheel is substantially reduced by centrifugal force, the driving force to negotiate the curve at a high speed tends to be lost by idling of said inner wheel.

To make up for such a drawback, some vehicles are being equipped with a revolution difference restricting mechanism such as of the clutch disk engaging type. However, with this mechanism, pre-pressure is usually being applied to the clutch discs to acquire necessary driving force even when one of the driving wheels is not catching the ground and, consequently, with this type, the two driving wheels become bound each other even during engine idling period when driving force is not being transmit from the engine or when a vehicle speed is being decelerated, thus making it difficult to make a combined application with a device demanding independence for revolution of respective wheels such as the anti-lock brake system.

Also, recently, revolution-sensitive revolution difference restricting mechanisms using viscous coupling are being widely used. The viscous coupling is a kind of viscous clutch which transmits torque by means of the shear resistance of a viscous fluid (such as silicone oil). Therefore, with this type, smoother revolution difference restricting effect can be obtained corresponding to the extent of occurring revolution difference. However, since the viscous fluid provides initial resistance, binding between the two driving wheels becomes inevitable although not as prominent as with the case of the clutch disc engaging type.

Being known as a differential gear capable to restrict the rotation difference during driving period only, with lesser restriction of respective driving wheels during engine idling period or when activating the brake, include the torque reacting type differential gear incorporating combinations of worm gears like the one having been disclosed by the Japanese Patent Laid-Open Publication No. 271926/1992.

With this type, a pair of screw-shaped worms that can coaxially rotate independently are being engaged with multiple worm wheels with the axis of rotation perpendicular to that of said pair of worms and when the worms are driven to rotate, the worm wheels rotate smoothly, while if they are let driven from the worm wheel side, they resist to rotate. This property characteristic with worm gears is being made use of with the aforesaid type, thus providing revolution biasing effect or revolution difference restricting effect to meet the requirements.

The revolution difference restricting mechanism of revolution sensitive type, being represented by ones using the viscous coupling, however, has a disadvantage to the effect that its torque transmissibility relies only on the viscosity of the fluid, when the viscosity of said fluid changes by variation in the temperature, the torque transmissibility itself changes making it difficult to acquire always stable revolution difference restricting effects.

Another problem with this type is that time lag occurs between the occurrence of revolution difference and the implementation of revolution difference restriction, thereby making it difficult to instantly react to changes in the vehicle movements.

While with the differential gears using worm gears, although the revolution difference restricting effect is stable with a differential gear using worm gears wherewith revolution difference restriction is being performed mechanically, its structure becomes complex because of its requirement for larger number of parts and extraordinarily high precision is necessary for machining and assembly of these parts and, moreover, the overall size of the mechanism becomes too large for its allowable torque level.

SUMMARY OF THE INVENTION

This invention intends, in view of the aforesaid issues, to provide a differential gear of a simpler construction whereby more stable revolution difference restricting effects can be obtained.

To achieve the purpose, the differential gear of this invention consists of a pair of rotary members positioned coaxially facing each other in the axial direction, a casing to house these rotary members, multiple rolling elements located in the space between the two rotary members facing each other in the axial direction and retainer that works to retain respective rolling elements in their positions between the two rotary members, said retainer being provided with multiple number of guide slots with their longitudes directed in the radial directions of said rotary members such guide slots opening through all the thickness of said retainer toward the axial direction of said rotary members to retain respective rolling elements allowing free movements, the axially facing surfaces of said pair of the rotary members being provided with grooves to engage to said multiple number of rolling elements in continuation in the peripheral direction and said grooves being so formed and positioned that when revolution difference occurs between the two rotary members, the multiple number of rolling elements make reciprocal movements inside said guide slots.

With this structure, when the casing and the retainer rotate around the axis, the rotary force, or torque, can be transmit to the grooves of the two rotary members via the multiple number of rolling elements, thus allowing the pair of rotary members to rotate integrally with the casing. Now, when a revolution difference occurs between the two rotary members, respective rolling elements housed in respective guide slots of said retainer roll along the grooves provided in said rotary members to make reciprocating movement inside said guide slots. At this time, when force causing a revolution difference between the two rotary members is applied to one of the two rotary members, the rolling elements which come to the following-side when a revolution difference occurs work to let trail the groove which comes to the leading side when the revolution difference occurs to their own movements and the reaction force occurring at this time become a resistance to restrict the revolution difference occurring between the two rotary members. In said case, the magnitude of the reaction force occurring between the grooves and rolling elements is being determined by the degree of the contact angle between the grooves and the rolling elements.

Consequently, with the differential gear of this invention, addition of a special mechanism to obtain the revolution difference restricting effect is not necessary and stable torque-sensitive revolution difference restricting effects can be obtained thus making it possible to provide an extraordinarily small sized and low priced differential gear of unprecedented advantages. Also, with the differential gear of this invention, since the revolution difference restricting effect settings can be optionally selected, wide range of applications can be expected.

BRIEF DESCRIPTIONS OF THE DRAWINGS

FIG. 26 is an explanatory exploded view of the grooves on a plain surface.

DESCRIPTIONS OF THE PREFERRED EMBODIMENTS

Figure 1:
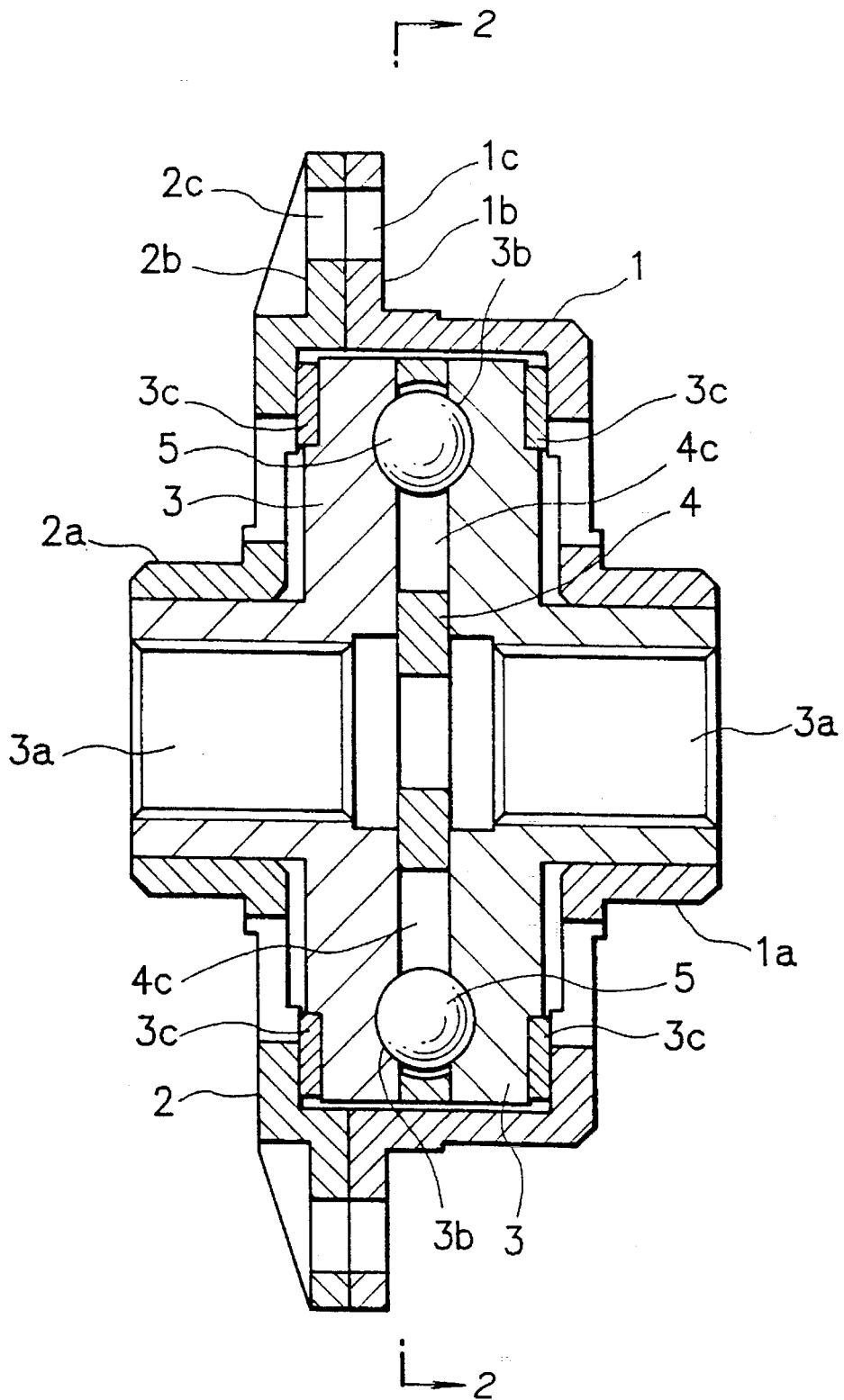
FIG. 1 is a side sectional view of the differential gear of the first exemplary embodiment of this invention.
Figure 2:
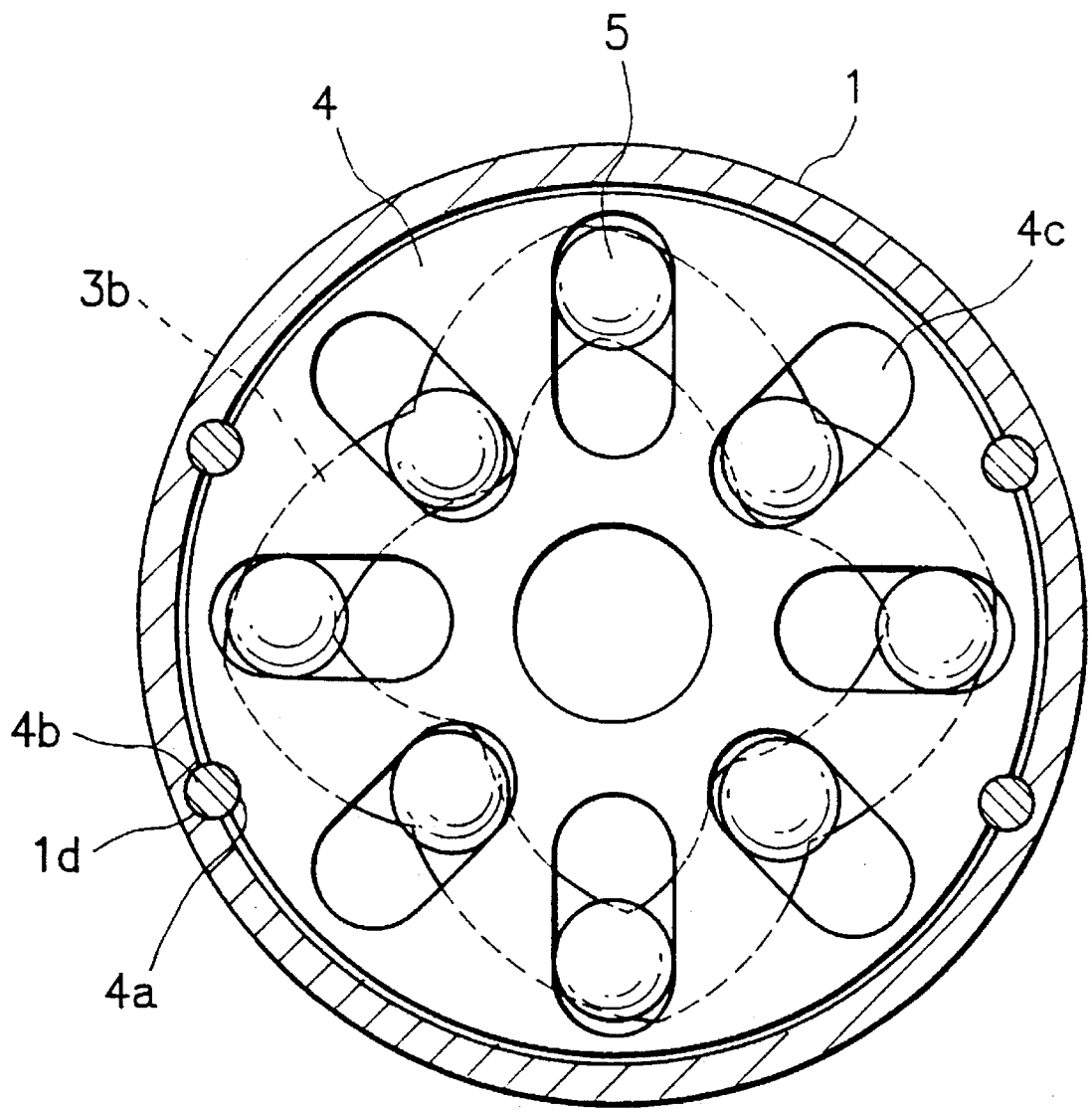
FIG. 2 shows the cross-section A—A of the drawing in FIG. 1.
Figure 3:
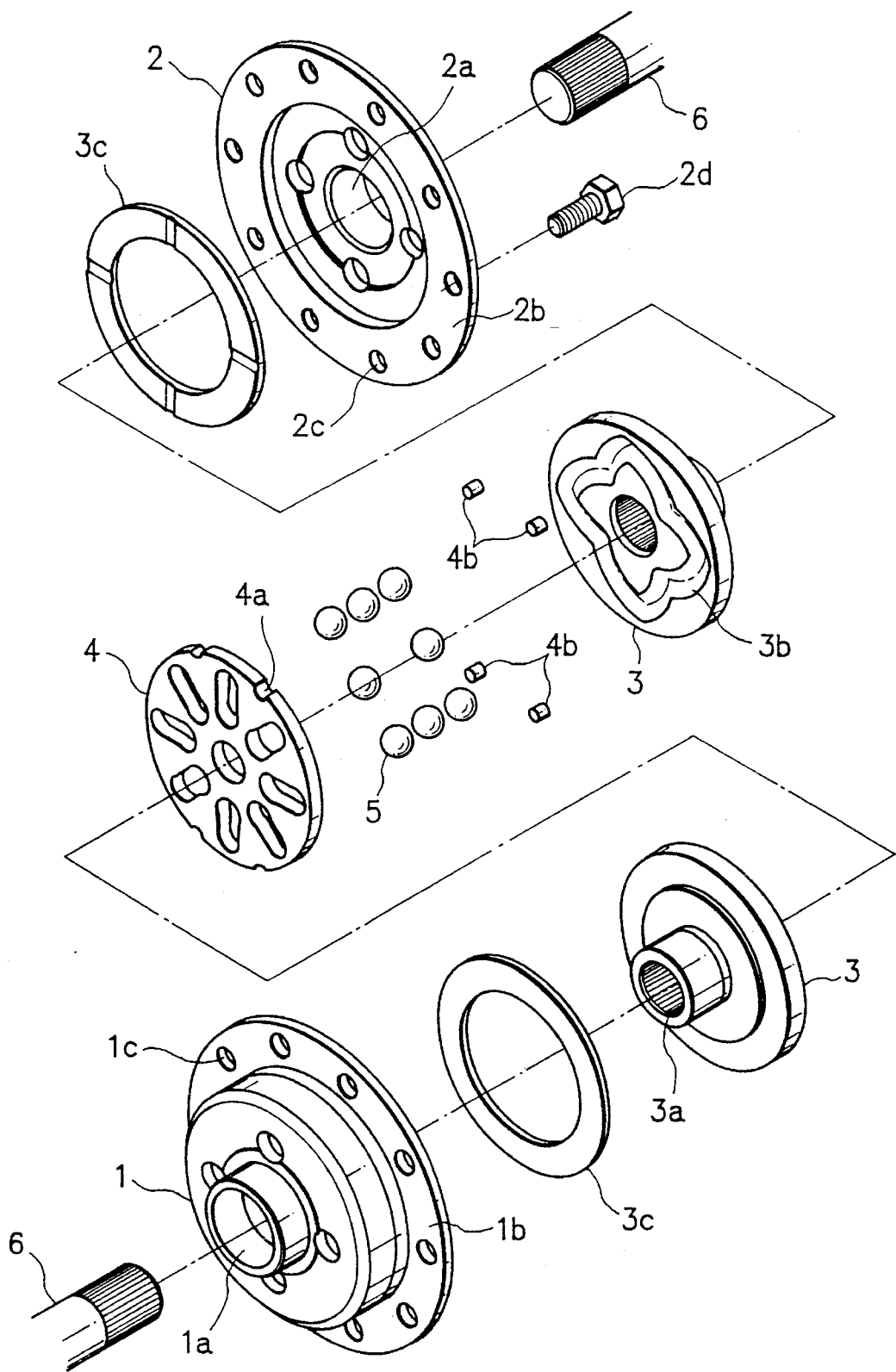
FIG. 3 is a perspective exploded view of the differential gear.

Referring more particularly to the exemplary embodiment of this invention, FIG. 1 through FIG. 10 show the first exemplary embodiment, FIG. 1 being a side sectional view of the differential gear of the first exemplary embodiment, FIG. 2 showing cross-section A—A of the drawing in FIG. 1 and FIG. 3 being an exploded perspective view of said differential gear.

Said differential gear consists of a gear case 1, a gear case cover 2 closing one end of said gear case 1, a pair of disc plates 3 coaxially facing each other, a center plate 4 located between the two disc plates 3 and multiple number of balls being sustained for free rolling by the center plate 4, said disc plates 3 constituting side rotary members, said center plate 4 constituting a retainer structure to hold said rolling elements and said balls constituting the rolling elements.

Said gear case 1 is of a cylindrical construction with its one end opened and with a bearing 1a supporting one of the disc plates 3 installed at its center. Around the periphery of the gear case 1, flange 1b is provided wherein multiple number of holes 1c for bolting are opened. Also, groove 1d is provided inside the gear case 1, which works to fasten the center plate 4.

Said gear case cover 2 is of a disc shape being provided with, at its center, a bearing 2a to support one of said disc plates 3. Around the periphery of said gear case cover 2, flange 2b is provided wherein multiple number of holes 2c for bolting are opened. It means that the gear case cover 2 is being attached to said gear case 1 by bolts 2d clamping said flanges 1b and 2b together.

Facing surfaces of the respective disc plates 3 are being flatly formed and the other side of each disc plate 3 is being formed into a coupler structure for connection with the wheel side drive shaft 6. On the mutually facing surfaces of said disc plates 3, a groove 3b is formed, in each surface, by which said multiple number of balls 5 are being sustained for free rolling and each groove is being formed in continuation along the peripheral direction. As shown in FIG. 2, each groove 3b consists of the first guide zones 3b-1 along which the balls 5 can move from inside toward outside in the radial direction and the second guide zones 3b-2 along which said balls 5 can move from outside toward inside in the radial direction in an alternate continuation and, with one of the pair of disc plates 3, said first guide zone 3b-1 is formed with a longer distance in the peripheral direction than said second zone 3b-2, while with the other disc plate 3, said second guide zone 3b-2 is formed with a longer distance in the peripheral direction than said first zone 3b-1. Namely, on the opposing surfaces of respective disc plates 3, when the points wherefrom the ball movement direction is being changed of the two facing grooves 3b overlaps (at the outside ends in case of FIG. 4), the other ends of the points are being dislocated in the peripheral direction (at the inside ends in case of FIG. 4). Also, a thrust washer 3c each is being inserted between one of said disc plates 3 and the gear case 1 and between the other disc plate 3 and the gear case cover 2.

Both surfaces of the center plate 4 are formed to flat planes and said center plate is being attached inside the gear case by the pins 4b which engage with grooves 4a provided on the periphery of said center plate 4 and mating grooves 1d formed inside the gear case 1. In said center plate 4, 8 slots 4c are opened in equal intervals in the peripheral direction which work to house said balls 5, respectively, for free rolling, the longitude of said slots 4c being directed radially, forming through openings in the axial direction. Namely, said slots 4c constitute the guide space.

Each ball 5 is housed in each slot 4c formed in said center plate 4 and contacting each groove 3b provided in each disc plate.

With a differential gear of the aforementioned structure, a ring gear (being omitted from the drawing) which works to transmit the drive force being output from the engine is connected to the flange 1b of the gear case 1 and the whole mechanism rotates around the axis of said gear case 1. It means that, when a drive force is transmit to said gear case 1, the center plate 4 integrally rotates together with said gear case 1 and this torque is then transferred to the grooves 3b of respective disc plates 3 via the balls 5 which then is transmit to the left-hand and right-hand drive shafts 6 being connected to respective disc plates 3.

Explanations shall hereafter be made on the movements in said differential gear in case revolution difference is not occurring between respective drive shafts 6, in case revolution difference is occurring between respective drive shafts 6 and in case revolution of one of the two drive shafts 6 is under a slippery environment.

First, in case revolution difference is not occurring between respective drive shafts 6 such as when a vehicle is travelling straight on a road surface with a sufficient friction factor, revolution difference does not occur between respective disc plate 3 and the balls 5 do not roll around and said disc plates 3 rotate integrally together with the center plate 4.

Next, in case revolution difference is occurring between respective drive shafts 6 while torque of the drive force is being transmit to respective drive wheels such as when a vehicle is making a turn on a road surface with a sufficient friction factor, revolution difference between respective drive shafts 6 is being provided by the following movements and performances.

That is, when respective disc plates 3 start to make relative-rotation between themselves in the opposing directions to compensate for the revolution difference between respective drive shafts 6, the ball 5 housed in each slot 4c rolls along the grooves 3b in respective disc plates 3 to make a reciprocating movement inside each slot 4c.

Namely, a ball 5 having been resting at an outside end in the radial direction of the groove start to move inward in the radial direction along the first guide zone 3b-1 of respective grooves and, after it arrives at the inward end position before changing its direction, the ball starts to move toward outside in the radial direction along the second guide zone 3b-2 of respective grooves 3b.

Figure 4:
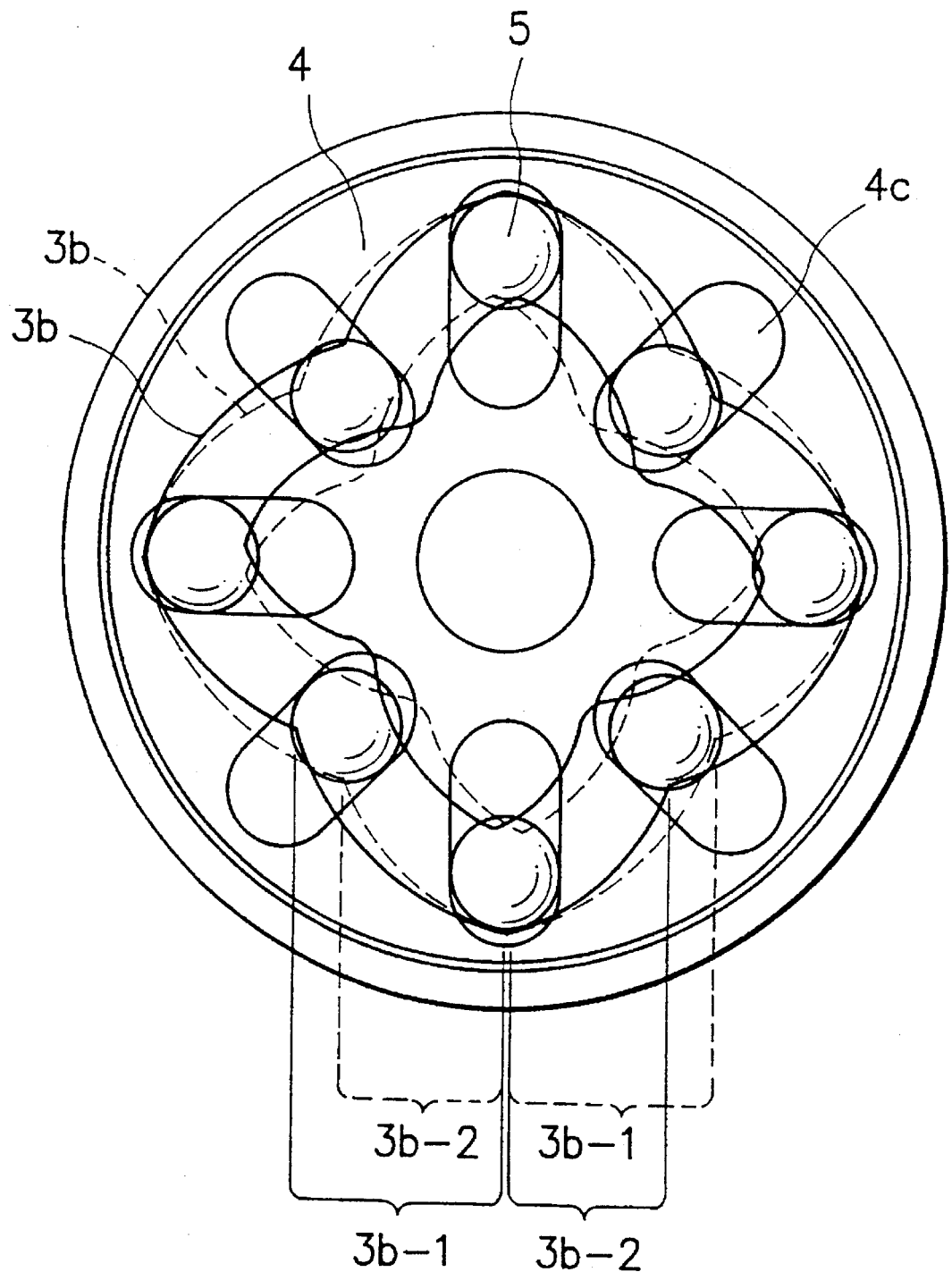
FIG. 4 is an explanatory drawing indicating the movement in the differential gear.
Figure 5:
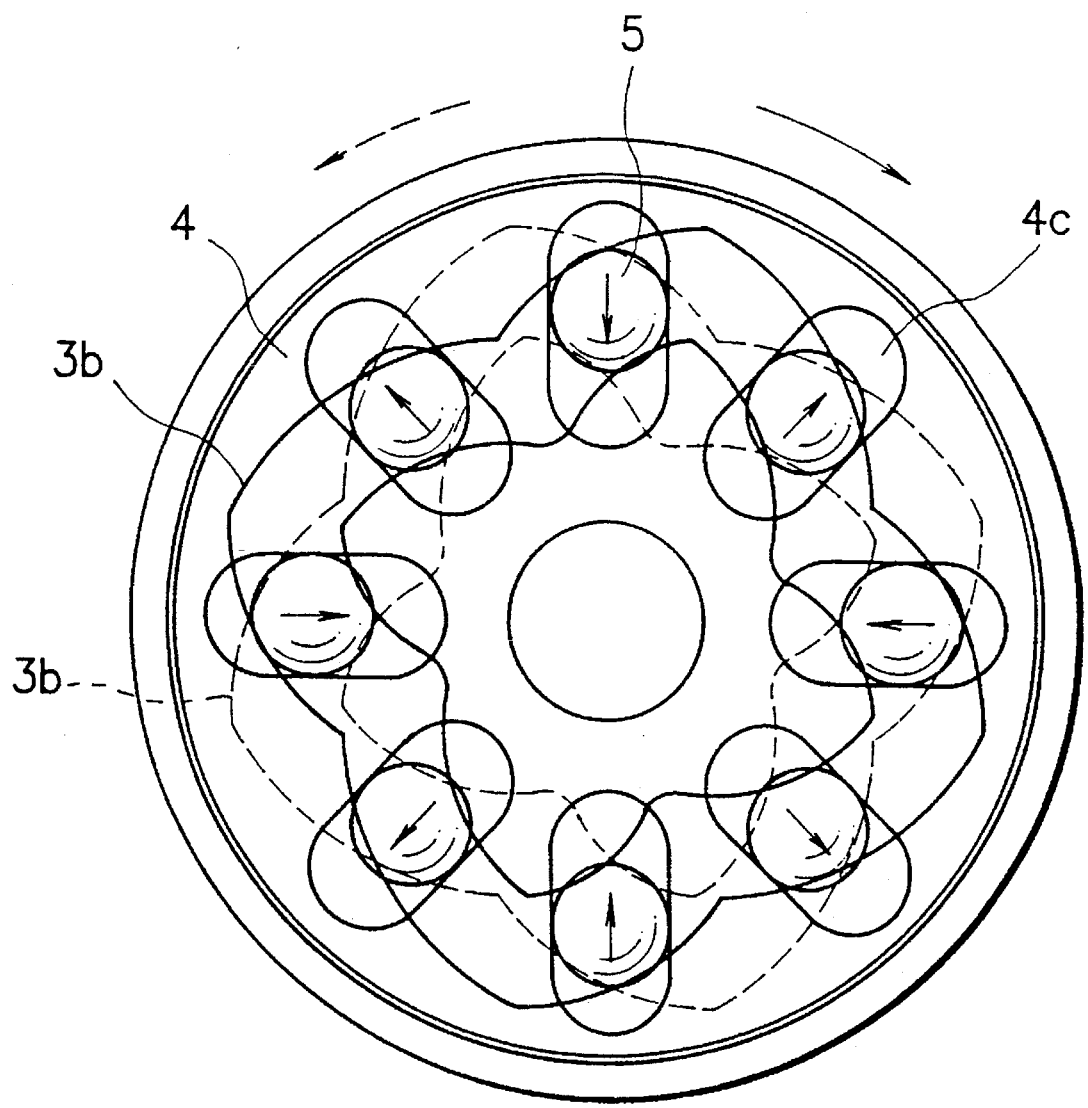
FIG. 5 is an explanatory drawing indicating the movement in the differential gear.
Figure 6:
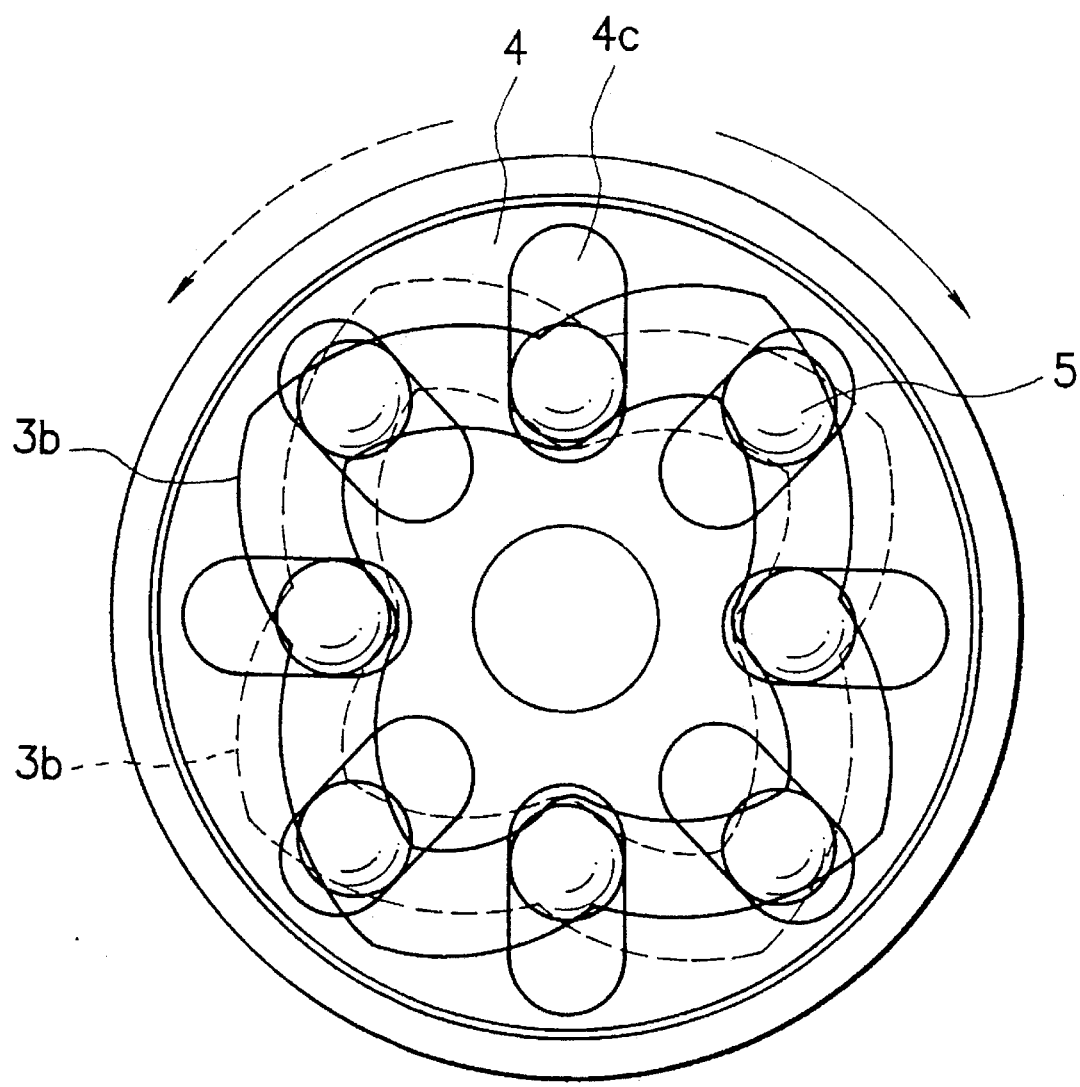
FIG. 6 is an explanatory drawing indicating the movement in the differential gear.

At this time, as shown in FIG. 4, although a half of all the balls or every other balls reach the direction changing points at the outside end points with respective grooves 3b, the direction changing points of a groove 3b meet those of the opposing groove at the inside end or outside end, the corresponding positions at the other outside or inside end of the two grooves being so designed to deviate each other, half of the balls cannot reach the direction changing point at the inside end, for example. In other words, if all the balls come to the direction changing points of respective grooves 3b, power cannot be transmit via the balls 5 and the grooves 3b and, therefore, it is necessary to so arrange that all the balls 5 may not come to the direction changing points of respective grooves 3b at the same time.

Then, in case revolution of one of the drive shafts 6 only is under a slippery environment such as when one of the drive wheels fails to catch the road surface with sufficient friction, revolution difference between respective drive shafts is limited by the following movements and performances. Namely, when revolution difference between respective disc plates 3 is occurring from even force, respective grooves 3b can let balls 5 roll along smoothly. While, when one of the two disc plates 3 only is being turned from its drive shaft 6 side, its groove 3b only of the facing two grooves acts to roll the balls 5 around and reaction force occurs at the contact planes between groove 3b and balls 5. This reaction resists to trailing of the other disc plate 3 to the one of the two mentioned above thus restricting the revolution difference between the two drive shafts.

Figure 7:
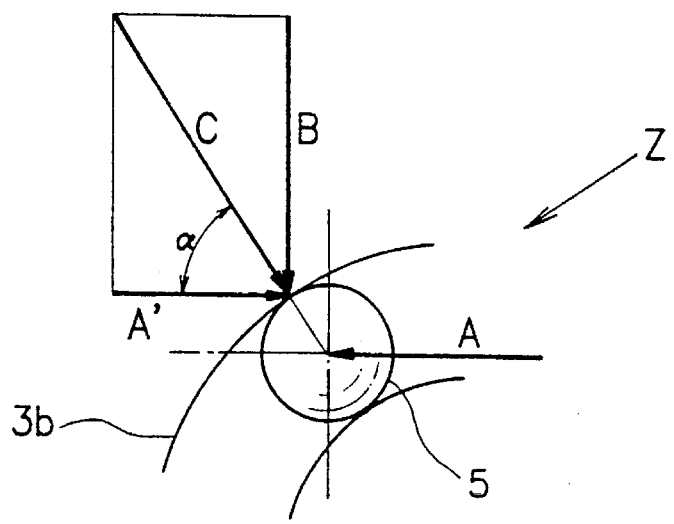
FIG. 7 is an explanatory drawing indicating the reactions occurring in the differential gear.
Figure 8:
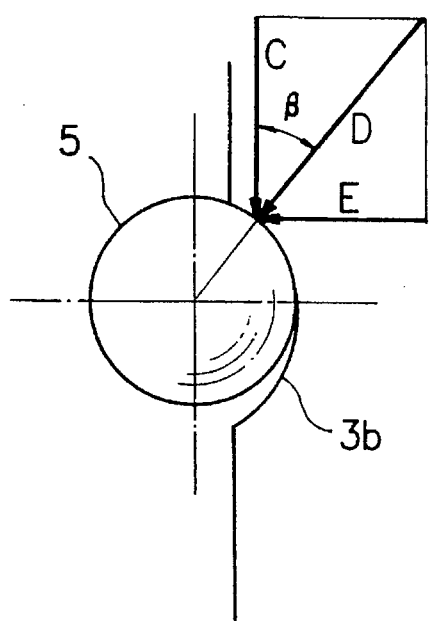
FIG. 8 is an explanatory drawing indicating the reactions occurring in the differential gear.

Referring to the principle of said revolution difference restricting effect using FIG. 7 and FIG. 8, FIG. 7 represents a status when a ball 5 and the groove 3b being viewed from the axial direction of a differential gear and, as shown in FIG. 7, torque A of the main shaft is being applied to the center of said ball 5.
Here:

$$A \mp A' \qquad (1)$$

At this time, a force C perpendicular to the contact surface with said ball 5 occurs with the groove 3b and its components are A' which is parallel with the torque A and B which is perpendicular to A'. Since C is perpendicular to the contact surface with said ball 5, it coincides with a line segment passing the center of said ball 5 and, assuming the angle produced between A' and C as $\alpha$, the magnitude of C becomes:

$$C = A' \times 1/\cos\alpha \qquad (2)$$

As shown in FIG. 8, when said ball 5 and groove 3b are seen from the direction of Z of FIG. 7, the actual reaction force working perpendicular to the contact surface between said groove 3b and said ball 5 is D and its components are E which is parallel to the axial direction of the gear case 1 and said C which is perpendicular to E.

Since said ball 5 rolls along in a diagonal contact with said groove 3b, C and E work as a force occurring from rolling friction and sliding friction but E is being called a thrust force in particular. Since D is perpendicular to the contact surface with said ball 5, it coincides with the line segment passing the center of said ball 5 and assuming the angle being produced by D and C as $\beta$, the magnitude of the bearing pressure D becomes:

$$D = C \times 1/\cos\beta \tag{3}$$

Also, the magnitude of the thrust force E can be indicated as:

$$E = C \times \tan\beta \tag{4}$$

Using the above equations (1), (2) and (3), the reaction force D can be calculated by:

$$D = A \times 1/\cos\alpha \times 1/\cos\beta \tag{5}$$

According to the equations (1) and (2), one of the components C can be calculated by:

$$C = A \times 1/\cos\alpha \tag{6}$$

According to the equations (1), (2) and (4), the other component, or the thrust force E, can be obtained by:

$$E = A \times 1/\cos\alpha \times \tan\beta \tag{7}$$

Namely, the reaction force D can be divided to components C and E and these components work as rolling friction and sliding friction and, at the same time, each thrust washer 3c is being pressed toward the axial direction by the thrust force E which then produces sliding friction to the main shaft revolution thus providing a revolution difference restricting effect. At this time, by setting the contact angles $\alpha$ and $\beta$ between said ball 5 and said groove 3b optionally, required revolution difference restricting effect can be obtained. Meanwhile, it is also to optionally adjust the degree of the revolution difference restricting effect by the thrust force E by use of some other inclusion than said thrust washer 3c, such as a bearing. The rolling friction occurring when said ball 5 rolls along said groove 3b or the sliding friction occurring when said ball 5 rolls along said groove 3b in diagonal contact also constitute a factor of said revolution difference restricting effect.

Figure 9:
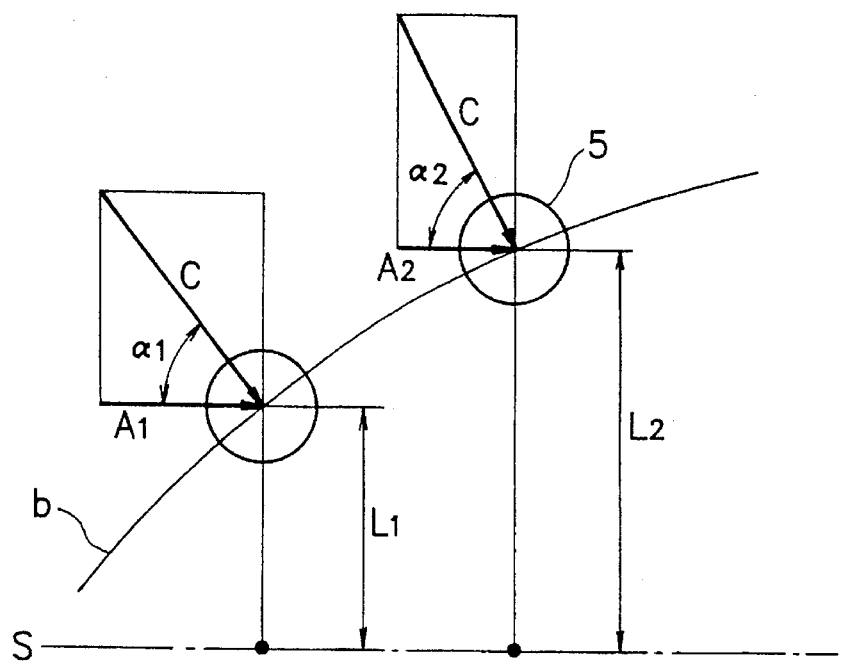
FIG. 9 is an explanatory drawing indicating the reactions occurring in the differential gear.

By the way, as shown in FIG. 9, since the distance between said ball 5 and the main shaft S (the axis of the gear case 1) changes when said ball 5 moves inside each slot 3b being guided by said groove 3b, the torque A of said main spindle S being applied to the contact surface between said ball 5 and said groove 3b changes. Consequently, by letting the contact angles $\alpha$ or $\beta$ continuously change depending on the contact point between said ball 5 and said groove 3b pursuant to variation of the torque A to maintain said friction force C and thrust force E constant, the revolution difference restricting effect can always be maintained to a constant level at which rotary position said disc plates 3 may be.

First, when changing the contact angle $\alpha$, assuming the distance between said ball 5 and said main shaft S as L1 and L2, since the transmitted torque T is always constant, the torque A1 and A2 applied to said ball 5 at its respective positions can be indicated as:

$$A1 = T/L1 \quad A2 = T/L2 \tag{8}$$

Consequently, assuming the contact angle at respective positions as $\alpha 1$ and $\alpha 2$ and using the equations (6) and (8):

$$C = T/L1 \times 1/\cos\alpha 1 = T/L2 \times 1/\cos\alpha 2 \tag{9}$$

Also, using the equation (7):

$$E = T/L1 \times 1/\cos\alpha 1 \times \tan\beta = T/L2 \times 1/\cos\alpha 2 \times \tan\beta \tag{10}$$

Therefore, the contact angles $\alpha 1$ and $\alpha 2$ should be set to satisfy the above equation.

Then, when changing the contact angle $\beta$, assuming the contact angle at respective positions as $\beta 1$ and $\beta 2$, using the above equations (6) and (8):

$$C = T/L1 \times 1/\cos\alpha = T/L2 \times 1/\cos\alpha \tag{11}$$

Also, using the equation (7):

$$E = T/L1 \times 1/\cos\alpha \times \tan\beta 1 = T/L2 \times 1/\cos\alpha \times \tan\beta 2 \tag{12}$$

The contact angles $\beta 1$ and $\beta 2$ should therefore be set to satisfy the above equation. Meanwhile, at this time, although the equation (11) cannot be used to find the condition to maintain the friction force C constant since a is constant, as the magnitude of the friction force C is far less influencing than the thrust force E, the revolution difference restricting effect can be maintained almost constant if the thrust force E is constant.

Figure 10:
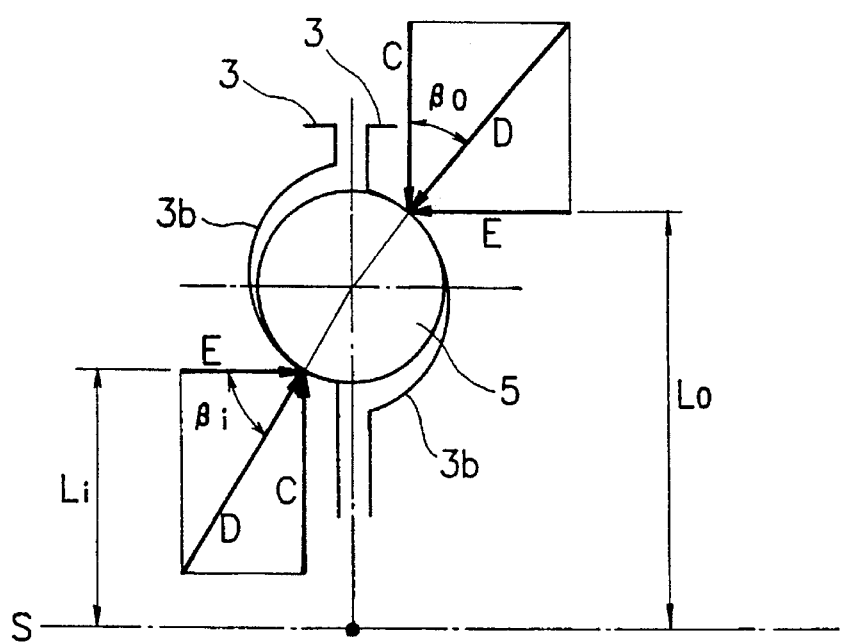
FIG. 10 is an explanatory drawing indicating the reactions occurring in the differential gear.

Meanwhile, the contact positions of a certain ball 5 with respective grooves 3b lean toward outside with one of the two grooves 3b and lean toward inside with the other groove 3b, as shown in FIG. 10. Consequently, since the distance Lo and distance Li from the contact surface between said ball 5 and respective grooves 3b and the main shaft S differs even with a single ball 5, the thrust force E occurring at respective groove (3b) side also differs. Therefore, by setting the contact angles $\beta o$ and $\beta i$ of the ball with respective grooves 3b so that the thrust force E can be maintained constant, pursuant to respective distances Lo and Li, the revolution difference restricting effect toward respective disc plates 3 can be maintained constant.

Like aforementioned, the differential gear of this exemplary embodiment can provide torque sensitive revolution difference restricting effects of reliable performances using a simpler structure and in smaller dimensions since the revolution difference is being restricted by the reaction force (friction force) occurring from the contact surface between said ball 5 and said groove 3b, when a torque is applied from one of the two disc plates 3 only, by letting said ball 5 move reciprocally inside the slot 4c along the guidance of respective grooves 3b. Also, by setting the contact angles $\alpha$ and $\beta$ between respective balls 5 and respective grooves 3b appropriately, a specific revolution difference restricting effect can also be obtained optionally.

Figure 11:
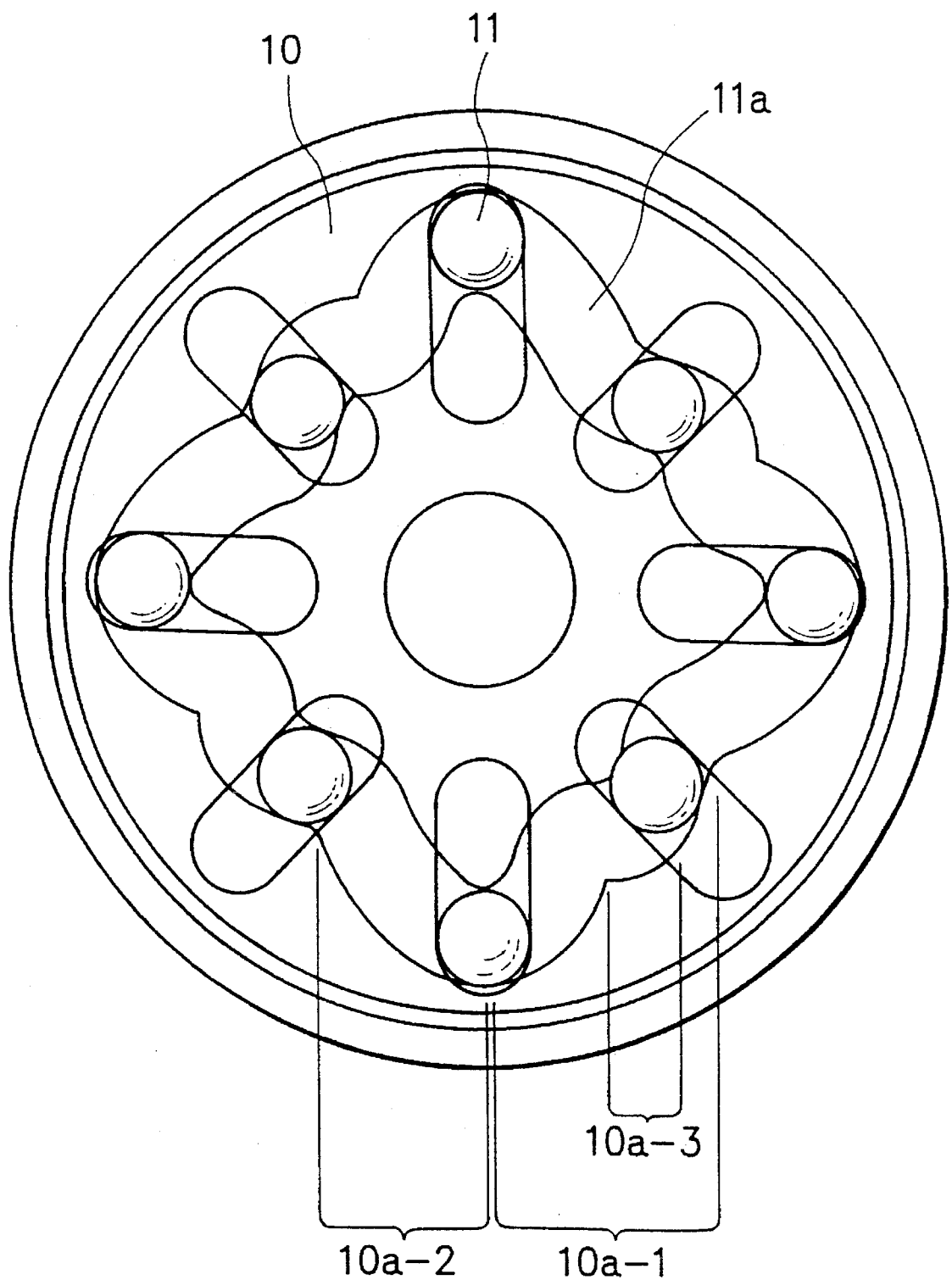
FIG. 11 is a front view of the disc plate of the second exemplary embodiment of this invention.
Figure 12:
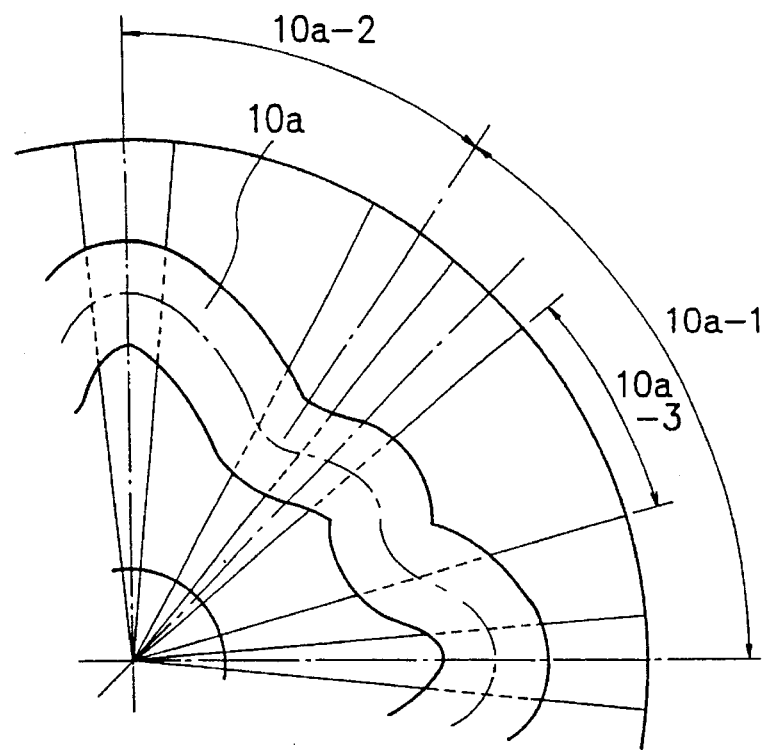
FIG. 12 is an enlarged view of the grooves.
Figure 13:
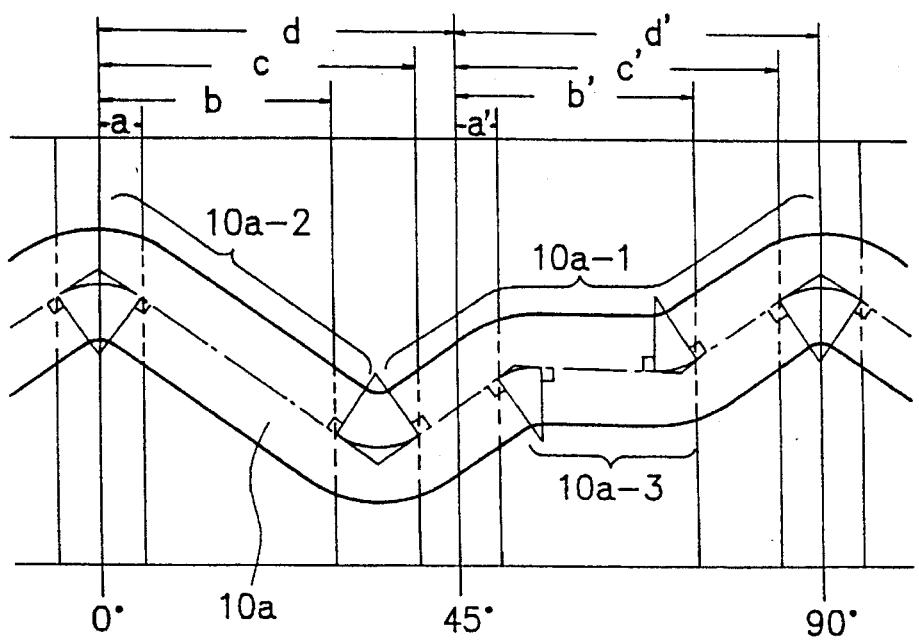
FIG. 13 is an explanatory exploded view of the grooves on a plane surface.

Referring to another exemplary embodiment of this invention, FIG. 11 through FIG. 13 show the second exemplary embodiment of this invention which differs from the aforementioned first exemplary embodiment in the shape of the groove. In these drawings, 10 stands for the disc plate, 10a does the groove and 11 does a ball. Said groove 10a consists of the first guide zone 10a-1 along which said ball 5 can move from inside toward outside in the radial direction, the second guide zone 10a-2 along which said ball 5 can move from outside toward inside in the radial direction and the third guide zone which works to sustain said ball 5 within a prescribed range in the radial direction (at a fixed position in the radial direction in case of this drawing) of said disc plate 10 in repetitions along the peripheral direction, the first guide zone 10a-1 and the second guide zone 10a-2 carrying equal contact angle formation with said ball 11. Also, with one of the two disc plates 10, the third guide zone 10a-3 is being located within the range of the first guide zone 10a-1, while with the other disc plate 10, said third guide zone 10a-3 is being located within the range of the second guide zone 10a-2. By this arrangement, when the pair of said disc plates 10 are placed face to face, similar to the case of the aforementioned first exemplary embodiment, when a set of direction changing points (from inward or from outward) of the pair of the disc plates 10 meet together, the other set of direction changing points of said two disc plates 10 deviates in position. Also, said groove 10a is so formed that the ball 11 makes a return trip in the radial direction when said disc plate 10 rotates by 90° in the angle of rotation which can be exploded on a plain surface as shown in FIG. 13. Although power transition does not occur between said ball 11 and said groove 10a at the radial direction changing points and within the third guide zone 10a-3, since the contact angle with said ball 11 is always equal within other ranges where power is being transmit, occurring thrust force also becomes constant. Namely, in FIG. 13, by forming the overall structure of said groove 10a so that when any ball 11 is at a position where power transition does not occur, some other ball 11 is always at a position where power transition is effective while satisfying: $a \leq a'$, $b \geq b'$, $c \leq c'$ and $d = d'$, always constant thrust force can be obtained wherever angle of rotation the disc plate 10 may be at. Also, since it is so designed that the contact angle with said ball 11 remains equal within the first guide zone 10a-1 and the second guide zone 10a-2, the cross-sectional shape of said groove 10a a can stay equal through the periphery thus making the machining process simpler.

Figure 14:
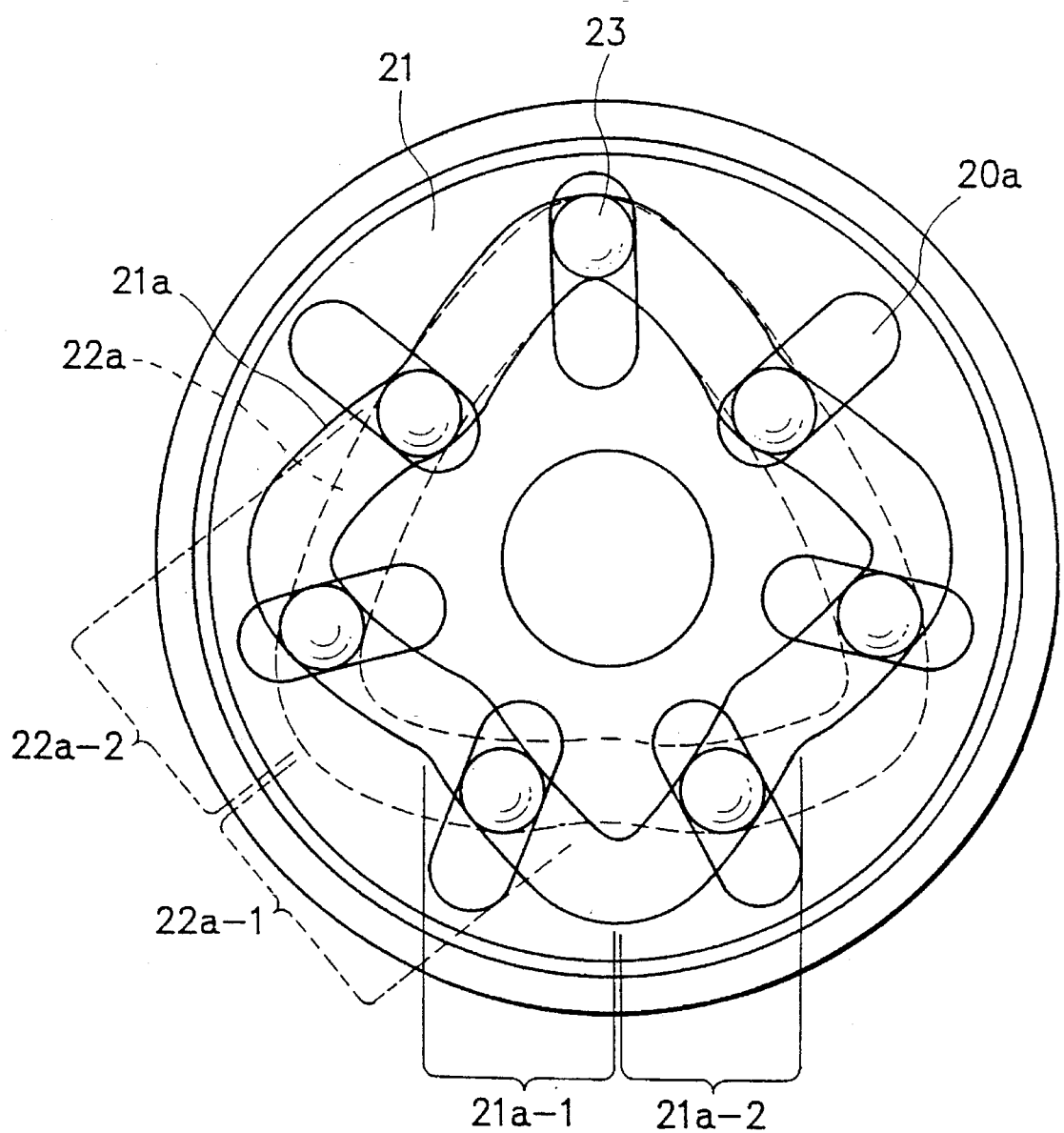
FIG. 14 is a front view of the disc plate of the third exemplary embodiment of this invention.
Figure 15:
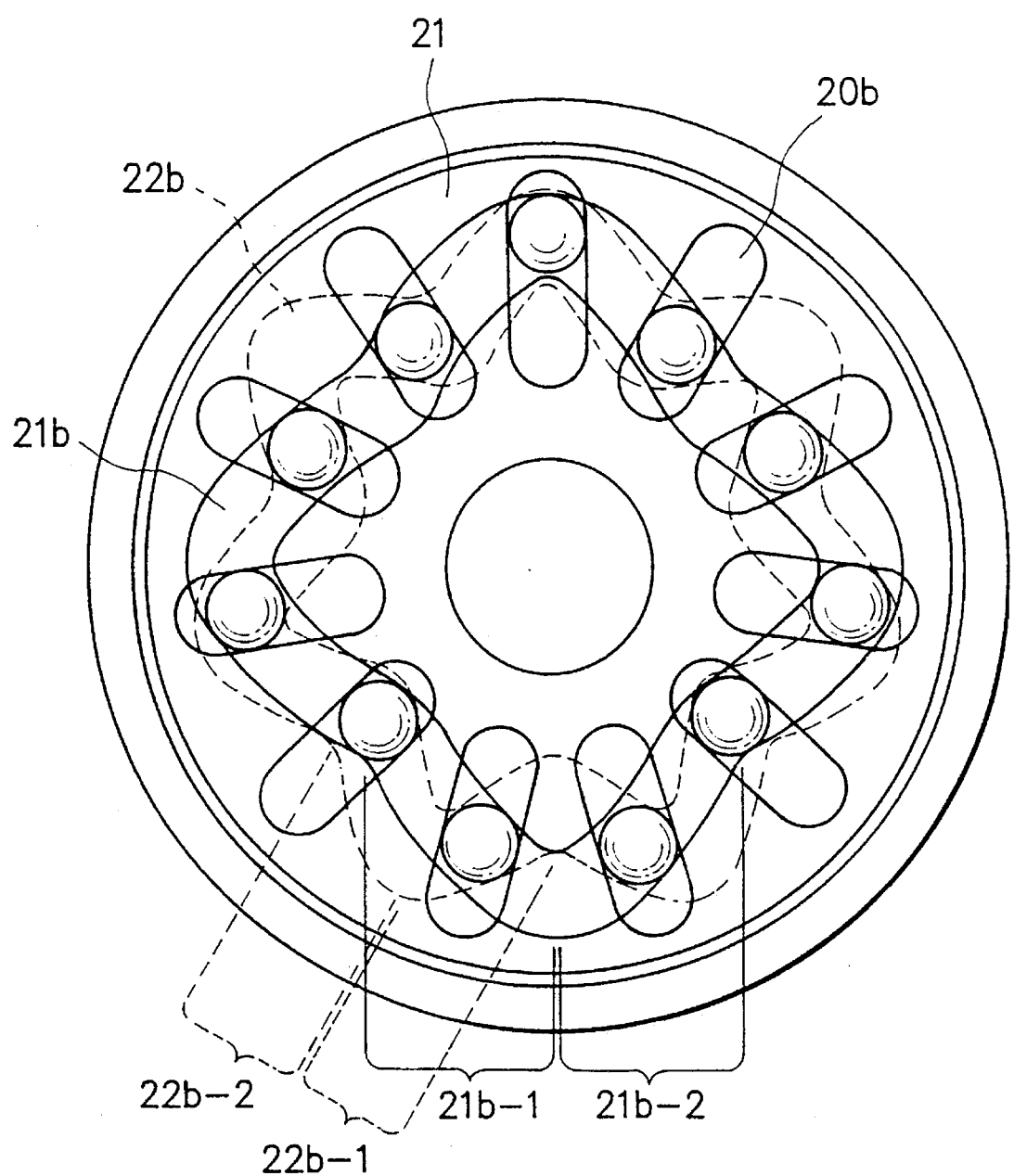
FIG. 15 is a front view of a disc plate with some other combination of grooves.
Figure 16:
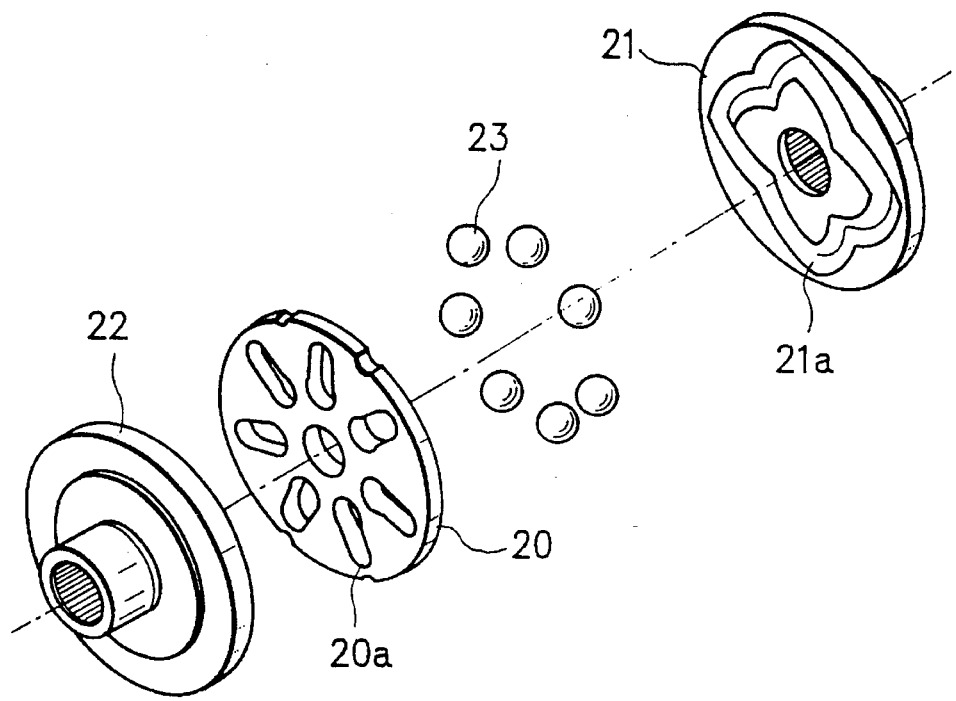
FIG. 16 is an exploded perspective view of the important section of the differential gear.

Referring to some other exemplary embodiment of this invention, FIG. 14 through FIG. 16 shows the third exemplary embodiment, FIG. 14 and FIG. 15 being front views of the disc plate and FIG. 16 being exploded perspective view of the important section of the differential gear of the third exemplary embodiment.

In these drawings, 20 stands for the center plate, 21 stands for one of the two disc plates, 22 stands for the other disc plate and 23 stands for the ball and difference from the aforementioned first exemplary embodiment is that the shape of the groove 21a and that of the groove 22a being provided in respective disc plates 21 and 22 are prominently different.

The groove 21a provided in one of the two disc plates 21 being indicated by continuous lines in FIG. 14 consists of the first guide zone 21a-1 along which said ball 23 can move from inside toward outside in the radial direction of said disc plate 21 and the second guide zone 21a-2 along which said ball 23 can move from outside toward inside in the radial direction of said disc plate 21, in repetitions in the peripheral direction, respective guide zones 21a-1 and 21a-2 carrying equal contact angle with said ball 23. Namely, 21a-1 and 21a-2 are being made symmetrical each other, different from the aforementioned first and the second exemplary embodiments, and in one of the two disc plates 21, four each of the first guide zones 21a-1 and the second guide zones 21a-2 are being formed alternately. Also, the groove 22a provided in the other disc plate 22 being indicated by broken lines in FIG. 14 consists of, similar to said disc plate 21, three each of the first guide zone 22a-1 and the second guide zone 22a-2 being formed symmetrically each other. The center plate 20 is provided with total seven slots 20a and the number of balls 23 is also seven.

When the number of guide zones is difference between said groove 21a and said groove 22a, since the number of ball direction changing points is different between the two, said disc plate 21 and said disc plate 22 rotates at different revolution and the ratio between the two different revolutions equals to the inverse of the number of the guide zones. Namely, in case of this exemplary embodiment, said ratio between one of the two disc plates 21 and the other disc plate 22 becomes 4:3. Consequently, the differential gear of this exemplary embodiment is for applications such as to the center differential gear of four-wheel drive vehicles where torque transmission under different fixed distribution ratios to respective drive shafts to the front wheels and the rear wheels, rather than for applications as the differential gear for installation between the left-hand and right-hand driving wheels like with the aforementioned first or second exemplary embodiments.

Also, with this exemplary embodiment, by matching the total number of the first guide zones 21a-1 or the second guide zones 21a-2 in one of the two disc plates 21 and of the first guide zones 22a-1 or the second guide zones 22a-2 of the other disc plate 22 and the total number of balls 23, the torque transmission loss can be limited to the minimum. Namely, the number of the first or second guide zones of the disc plate 21 being four and that of the other disc plate 22 being three, the number of balls 23 becomes seven. Thus, existence of the duplication of the direction changing points of the groove 21a and the groove 22a where the ball 23 cannot transfer the driving force is always upto one point at any angle of rotation and at least six other balls 23 always remain at positions where they contact the grooves 21a and 22a in an inclined angle to the direction of action of the torque. Also, when a groove 21b consisting of total four first guide zones 21b-1 or second guide zones 21b-2 and a groove 22b consisting of total seven first guide zones 22b-1 or second guide zones 22b-2 are combined, the number of balls 23 and the number of slots 20b formed in the center plate 20 become eleven, respectively, as shown in FIG. 15.

Meanwhile, when the numbers of the first or second guide zones of respective disc plates are mutually even numbers, the chance of occurrence of simultaneous duplication of the direction changing points becomes at upto 2 points.

Figure 17:
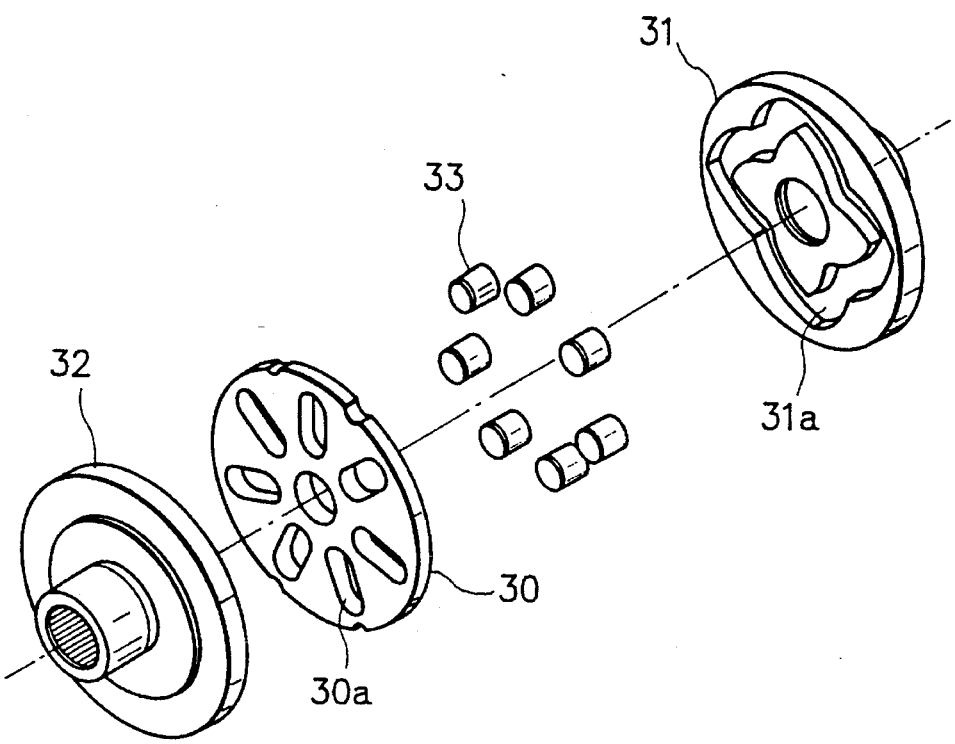
FIG. 17 is an exploded perspective view of the important section of the differential gear of the fourth exemplary embodiment of this invention.

Referring further to some other exemplary embodiment of this invention, FIG. 17 shows the fourth exemplary embodiment which uses rollers, rather than balls, as the rolling element. In this drawing, 30 stands for the center plate, 31 stands for one of the two disc plates, 32 stands for the other disc plate and 33 stands for the roller.

Namely, similar to the aforementioned exemplary embodiments, slots 30a are formed in the center plate 30 and in each slot 30a, each roller 33 is housed directing its rolling axis to the direction of the axis of rotation of the two disc plates 31 and 32. Also, in respective disc plates 31 and 32, grooves such as the groove 31a (since only one disc plate 31 is being facing this way in the drawing) are provided similar to the aforementioned other exemplary embodiments and said groove 31a is so formed to appropriately match the ends of said rollers 33.

With this structure, force being applied to respective rollers 33 is always in the direction perpendicular to the axis of rotation of respective disc plates 31 and 32, reaction force in the direction of the axis of rotation, means thrust force, does not occur.

Figure 18:
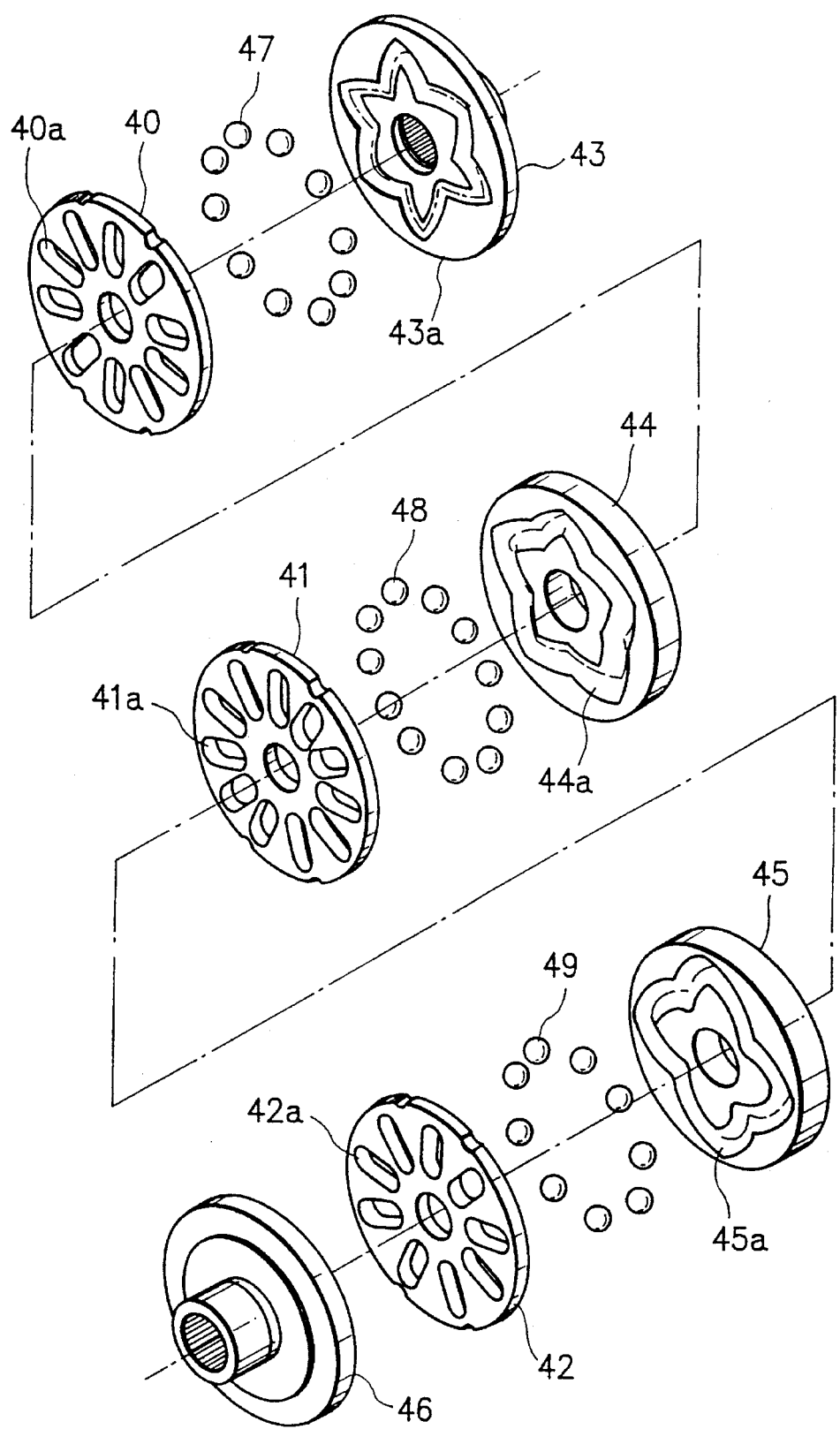
FIG. 18 is an exploded perspective view of the important section of the differential gear of the fifth exemplary embodiment of this invention.

Referring further to some other exemplary embodiment of this invention, FIG. 18 shows the fifth exemplary embodiment being equipped with total three center plates and total four disc plates. In this drawing, 40, 41 and 42 represent the center plate, respectively, 43, 44, 45 and 46 stand for the disc plate, respectively, and 47, 48 and 49 stand for the ball, respectively.

The first disc plate 43 to be connected to the output shaft of one side faces the second disc plate 44 across the first center plate 40 and in the surface of said first disc plate 43 facing the second disc plate 44, a groove 43a consisting of total six each of the first and second guide zones is being formed, and in the surface of said second disc plate 44 facing said first disc plate, a groove (omitted in the drawing) consisting of total four each of the first and second guide zones is being formed. Also, in the first center plate 40, total ten slots 40a are provided and in said ten slots 40a, the same number of balls are being housed, one ball in each slot.

The second disc plate 44 faces the third disc plate 45 across the second center plate 41 and in the surface of said second disc plate 44 facing the third disc plate 45, a groove 44a consisting of total five each of the first and second guide zones is being formed, and in the surface of the third disc plate 45 facing the second disc plate 44, a groove (omitted in the drawing) consisting of total six each of the first and second guide zones is being formed. Also, in the second center plat 41, total eleven slots 41a are provided and in said eleven slots 41a, the same number of balls are being housed, one ball in each slot.

The third disc plate 45 faces the fourth disc plate 46, which connects to the output shaft of the other side, across the third center plate 42 and in the surface of said third disc plate 45 facing the fourth disc plate, a groove 45a consisting of total four each of the first and second guide zones is being provided, and in the surface of said fourth disc plate 46, a groove (omitted in the drawing) consisting of total five each of the first and second guide zones is being formed. Also, in the third center plate 42, total nine slots 42a are provided and in said nine slots, the same number of balls are being housed, one ball in each slot.

With this structure, when the first disc plate rotates in forward direction, the second disc plate 44 rotates in reverse direction, the third disc plate 45 rotates in forward direction and the fourth disc plate rotates in reverse direction, thus the disc plates at both ends 43 and 46 rotate in opposite directions. The rotation ratio among these disc plates can be calculated by the number of the first or second guide zones of each disc plate and the ratios are, in the sequence of the first disc plate 43 and after:

$$1:(-6/4):(5/6):(-4/5)$$

Consequently, assuming that the number of rotation of the first disc plate 43 as 1 (one), the number of rotation of the fourth disc plate 44 becomes:

$$1 \times (-6/4) \times (5/6) \times (-4/5) = -1$$

Therefore, the rotation ratio between the disc plates at both ends 43 and 46 becomes 1:1.

As it is possible to obtain the rotation ratio of 1:1 even when grooves with symmetrically shaped first and second guide zones are employed, if more than two disc plates and plural number of center plates are combined, thus allowing applications as the differential gear for the left-hand and right-hand drive wheels of vehicles.

Figure 19:
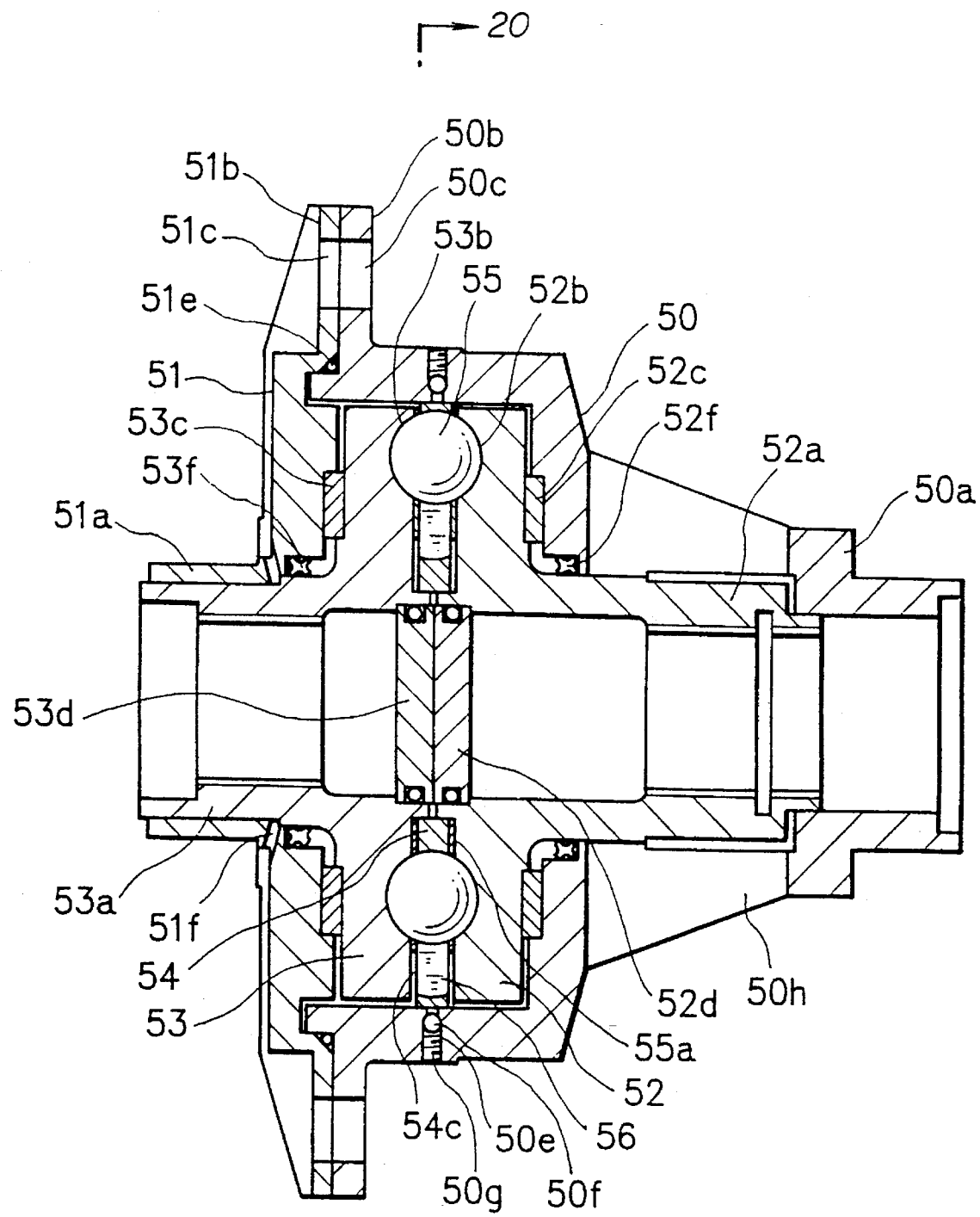
FIG. 19 is an exploded perspective view of the important section of the differential gear of the sixth exemplary embodiment of this invention.
Figure 20:
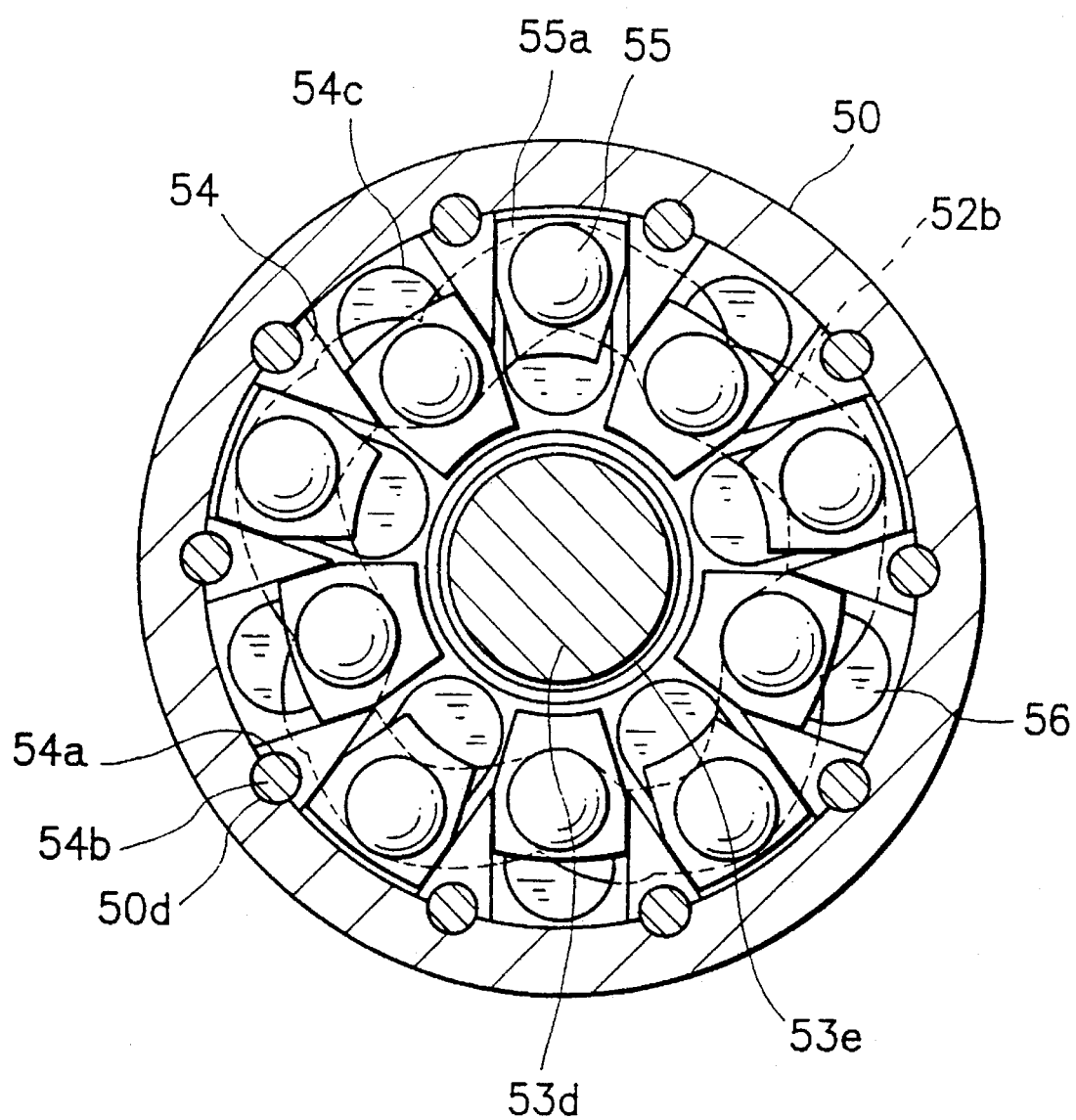
FIG. 20 shows the cross-section A—A of the drawing in FIG. 19.
Figure 21:
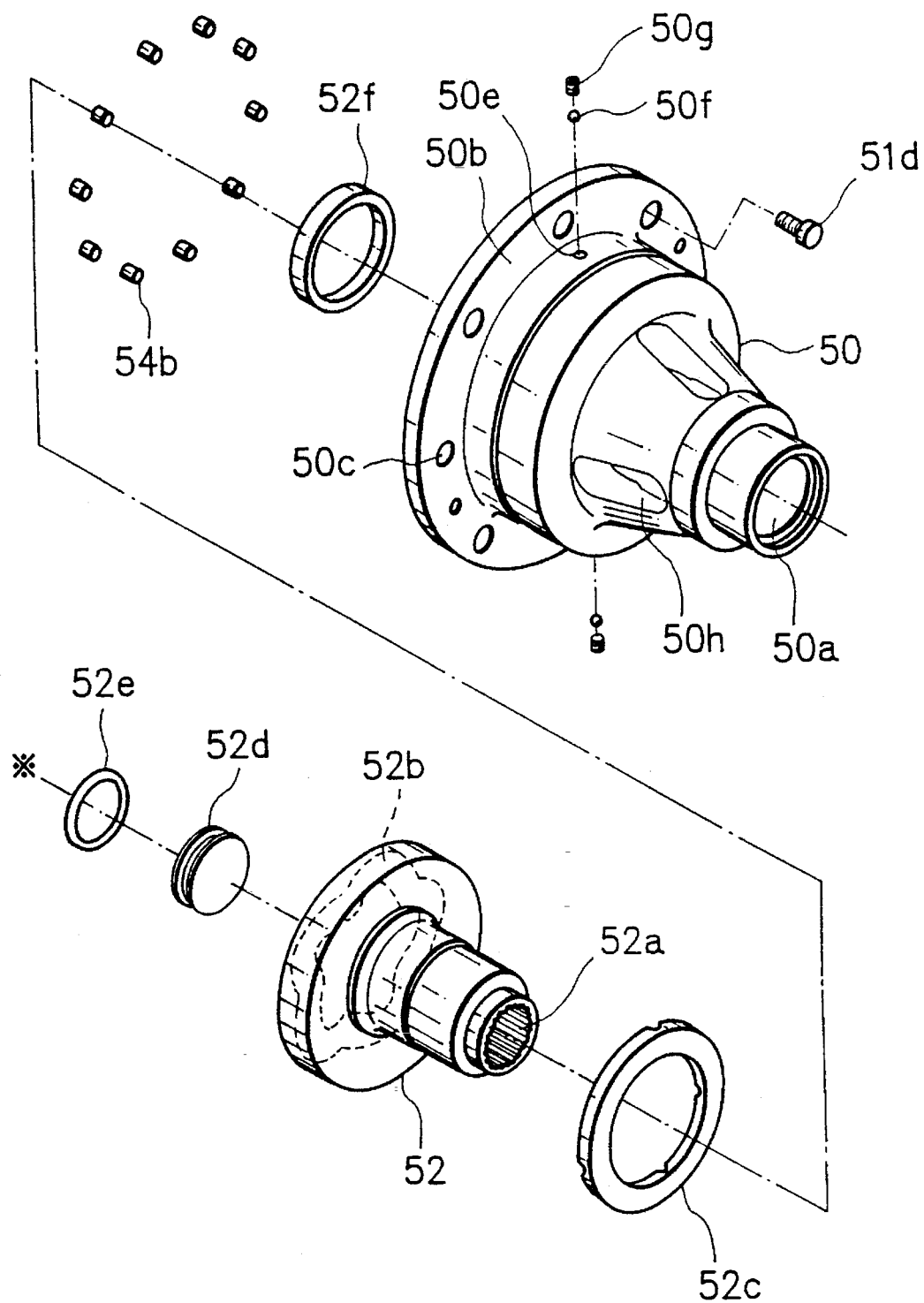
FIG. 21 is an exploded perspective view of the differential gear.
Figure 22:
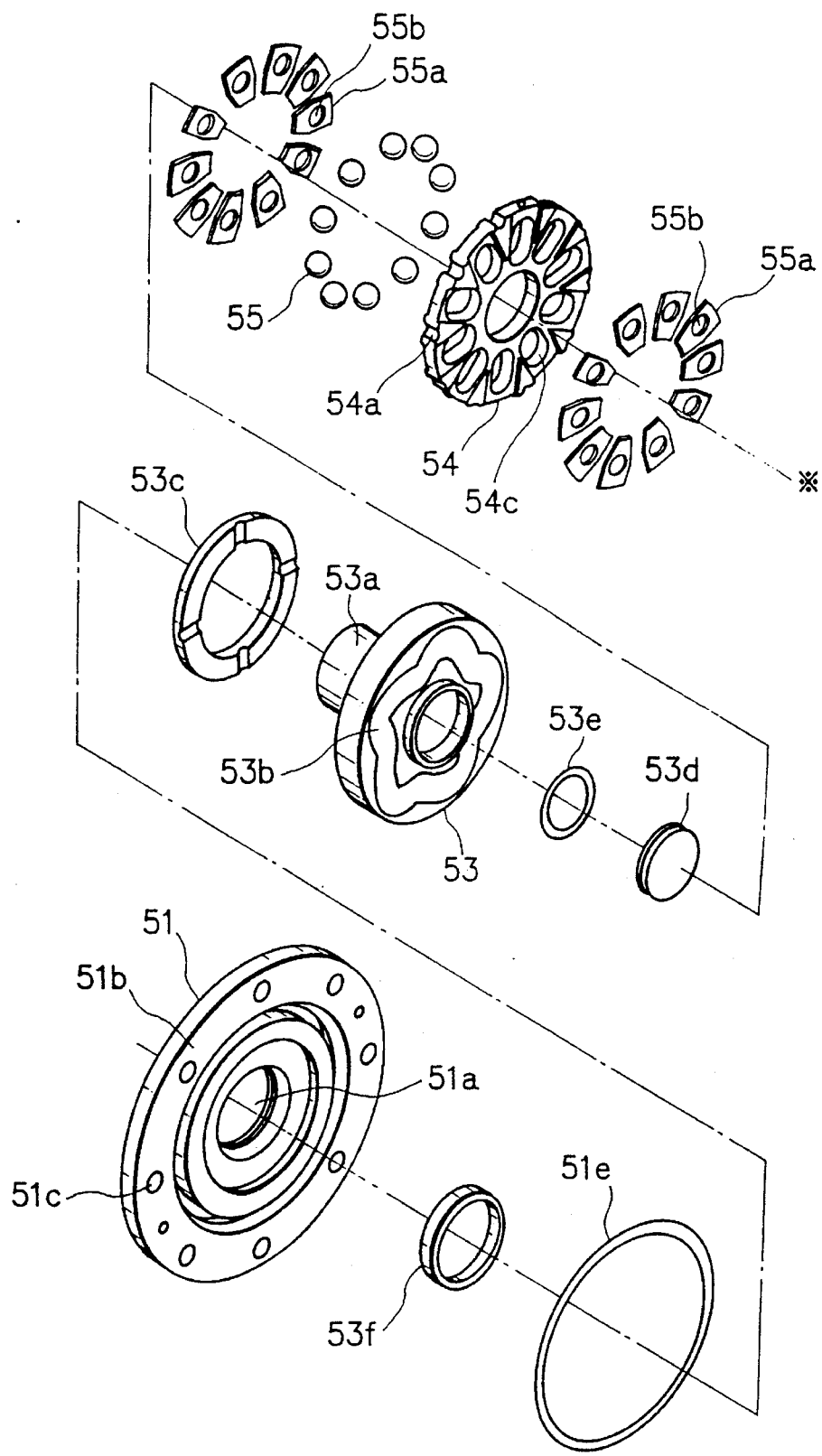
FIG. 22 is an exploded perspective view of the differential gear.

Referring further to some other exemplary embodiment of this invention, FIG. 19 through FIG. 22 show the sixth exemplary embodiment, FIG. 19 being a side sectional view of the differential gear of this exemplary embodiment, FIG. 20 showing the cross-section A—A of the drawing of FIG. 19 and FIG. 21 and FIG. 22 are exploded perspective views of said differential gear.

Meanwhile, the alternate long and short dash lines in FIG. 21 and FIG. 22, respectively, should be deemed to continue at the side marked with "X".

The differential gear of this exemplary embodiment consists of a gear case 50, a gear case cover 51 covering one end of said gear case, a pair of disc plates 52 and 53 positioned coaxially facing each other, a center plate 54 positioned between said two disc plates 52 and 53, and multiple number of balls retained by the center plate 54 for free rolling, the space where respective balls 55 rolls about inside the gear case 50 being filled by viscous fluid 56. Namely, said disc plates 52 and 53 constitute the rotary members, the center plate constitutes the retainer and balls 55 constitute the rolling elements, respectively.

Said gear case 50 is of a cylindrical shape with its one end opened and a bearing 50a to support one 52 of the disc plates is being provided around the axial center thereof. A flange 50b is provided around the peripheral edge of said gear case 50 wherein multiple number of bolting holes 50c are being opened. Also, grooves 50d are provided inside the gear case 50 for the purpose of fastening the center plate 54. In the peripheral surface of said gear case 50, total two filling ports 50e through which said viscous fluid 56 is to be supplied are provided, each filling port 50e being sealed by balls 50f after said viscous fluid 56 supply has been completed and said ball 50f being fastened by screwing in the screw plugs 50g through said filling ports 50e. Also, said Gear case 50 are provided with multiple number of holes 50h through which externally supplied lubricating oil passes through.

Said gear case cover 51 is of a disc shape and a bearing 51a to support the other disc plate 53 is provided in the center thereof. A flange 51b is provided around the periphery of said gear case cover 51 wherein multiple number of bolting holes are being opened. Namely, said gear case cover 51 is installed to said gear case 50 using bolts 51d to clamp said flange 50b and said flange 51b together via an O-ring 51e for sealing. Also, multiple number of holes 51f are opened in said gear case cover 51 through which externally supplied lubricating oil passes through.

The facing surfaces of said pair of disc plates 52 and 53 are being flatly formed and the other side of the flat surfaces of said pair of disc plates 52 and 53 are being formed into coupler structures 52a and 53a for connection with the drive shafts to the wheels. Said couplers 52a and 53a are of a hollow structure opening in the axial direction and one 52a of these two couplers is longer in the axial direction than the other coupler 53a. Grooves 52b and 53b wherein balls 55 engage for free rolling are provided in the facing surfaces of said pair of disc plates 52 and 53 and said grooves 52b and 53b are formed in continuation in the peripheral direction, respectively. Said grooves 52b and 53b can be formed into shapes having been employed by the aforementioned first, second or third exemplary embodiment and, their performances and effects being the same as with said exemplary embodiments, explanations shall therefore not be repeated here. Meanwhile, thrust washers 52c and 53c are being provided between one 52 of the two disc plates and said gear case 50 and between the other disc plate 53 and the gear case cover 51. Also, the center opening on mutually facing sides of respective disc plates 52 and 53 are being covered by disc caps 52d and 53d, respectively, and sealing O-rings 52e and 53e are being provided between the peripheral surfaces of said disc caps 52d and 53d and the bore surfaces of said disc plates 52 and 53. Moreover, clearances between said couplers 52a and 53a of respective disc plates 52 and 53 and respective bearings 50a and 51a are being enclosed by oil seals 52f and 53f.

Both surfaces of the center plate 54 face the surfaces of the two disc plates 52 and 53, respectively, and said center plate 54 is being attached inside said gear case 50 by means of the grooves 54a provided around the periphery of said center plate 54 and grooves 50d provided inside said gear case 1 and engaging pins 54b. In said center plate 54, total ten slots 54c are provided at equal intervals in the peripheral direction which work to house the balls 5 for free rolling, one ball in each slot, the longitude of said slots being directed toward the radial directions of said center plate 54 and said slots being open through the axial direction of the differential gear. Namely, said slots work as the guides.

Balls 55 are being housed in respective slots 54c provided in said center plate 54, one ball in each slot, and each ball engages into the grooves 52b and 53b of the two disc plates 52 and 53. Balls 55 are being sustained by multiple number of ball holders 55a being provided on both sides of said center plate 54 and a hole 55b to contain the ball 55 is opened in each ball holder 55a. Namely, these ball holders 55a covers the slots 54c in the center plate 54 and said ball holders 55a are so designed to move in the radial direction of said center plate 54 together with their balls 55.

The viscous fluid 56 consists of silicon oil, etc. and fills the space inside the grooves 52b and 53b of respective disc plates 52 and 53 and the space inside the slots 54c of said center plate 54, namely all the space inside the gear case 50 being enclosed by oil seals 52f and 53f.

With a differential gear of the aforesaid structure, when revolution difference occurs between the disc plate 52 and 53, balls 55 roll about along the grooves 52b and 53b provided in respective disc plates 52 and 53 to make reciprocal movements inside the slots 54c in the center plate 54. At this time, when one of the two disc plates 52 or 53 only is driven to rotate from the drive shaft 57 side, similar to the circumstances under the first exemplary embodiment, the reaction force which said balls receive from said grooves 52b and 53b works to restrict the revolution difference. Also, when the revolution difference between the two disc plates 52 and 53 expands larger, resistance of the viscous fluid 56 against respective balls 55 increases and this resistance also limits the revolution difference. Namely, when balls move about inside the slots 54c being sealed by respective ball holders 55a, said viscous fluid 56 flows through the small clearance between the internal wall of said slot 54c and the surface of said ball 55 and the passing resistance at this time also works to limit the revolutions difference. In this case, the revolution difference restricting effect becomes larger corresponding to the revolution difference between the two disc plates 52 and 53.

Therefore, with the differential gear of this exemplary embodiment, revolution-sensitive revolution difference restricting effect occurring from the resistance of the viscous fluid 56 against balls 55 can be obtained in addition to the torque-sensitive revolution difference restricting effect being derived from the reaction force the balls 55 receive from the grooves 52b and 53b, always reliable revolution difference restriction can be expected for all the travelling modes of a vehicle. Meanwhile some other viscous liquid than silicon oil may also be used as said viscous fluid 56.

Figure 23:
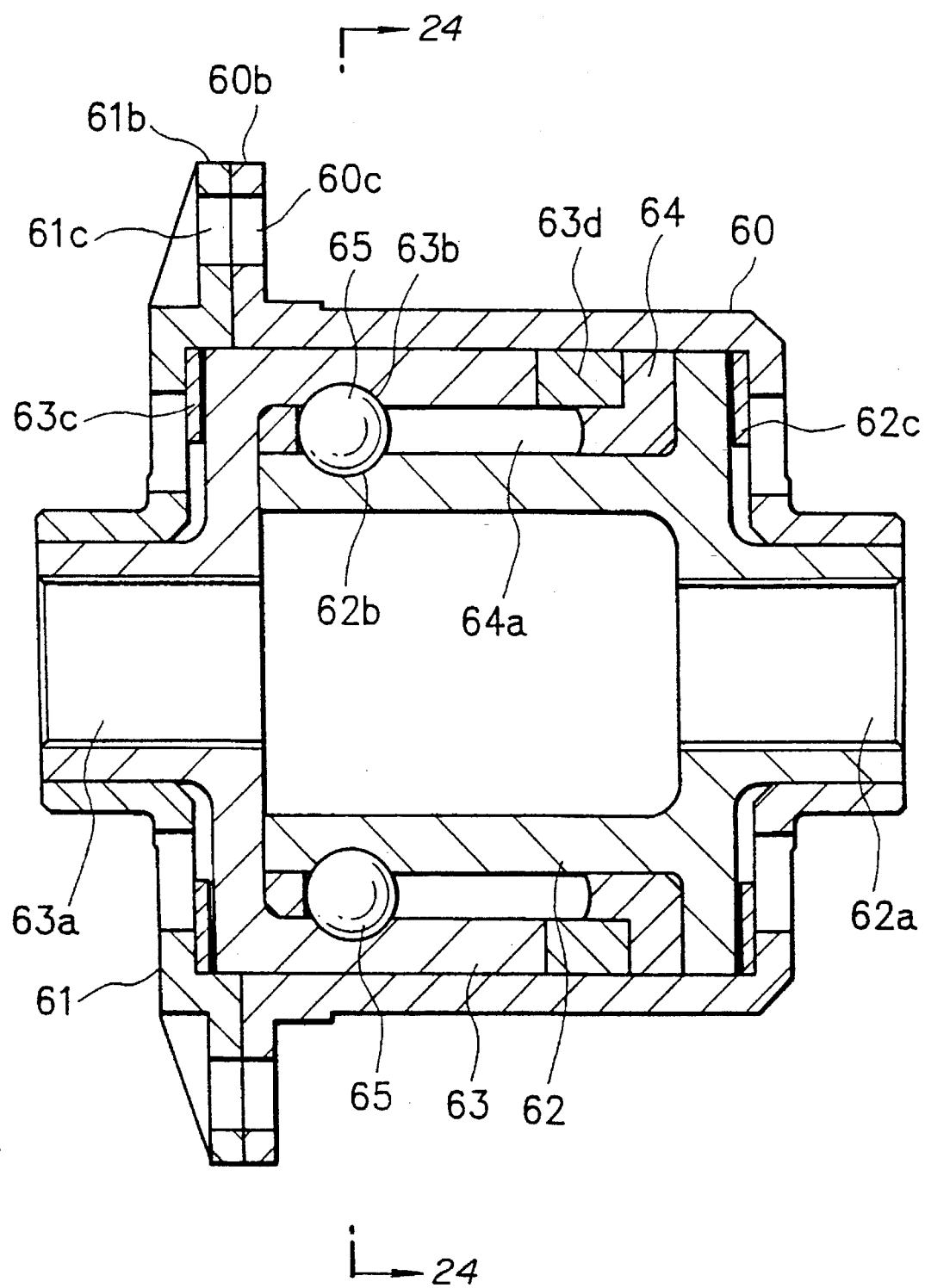
FIG. 23 is a side sectional view of the differential gear of the seventh exemplary embodiment of this invention.
Figure 24:
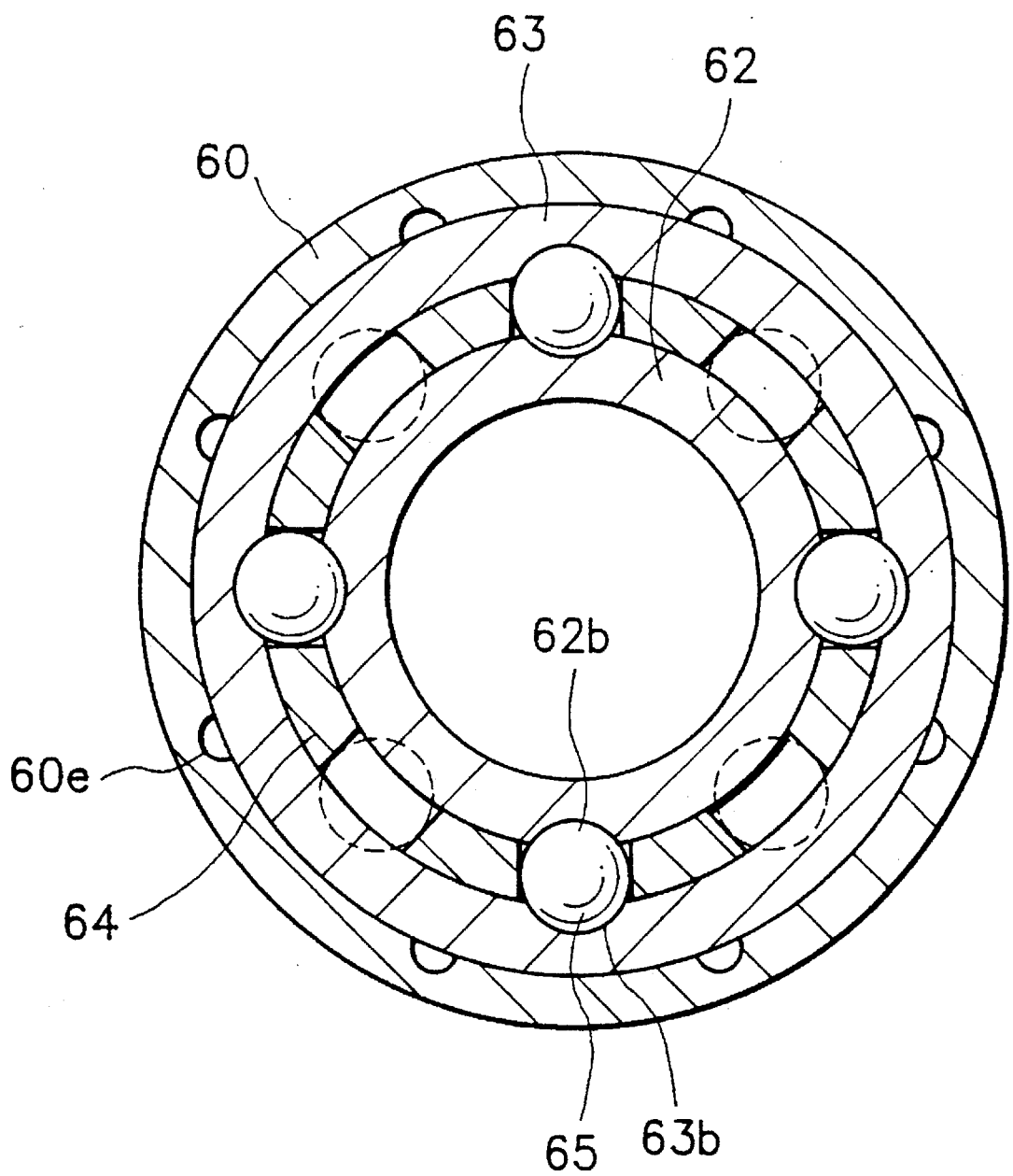
FIG. 24 shows the cross-section A—A of the drawing in FIG. 23.
Figure 25:
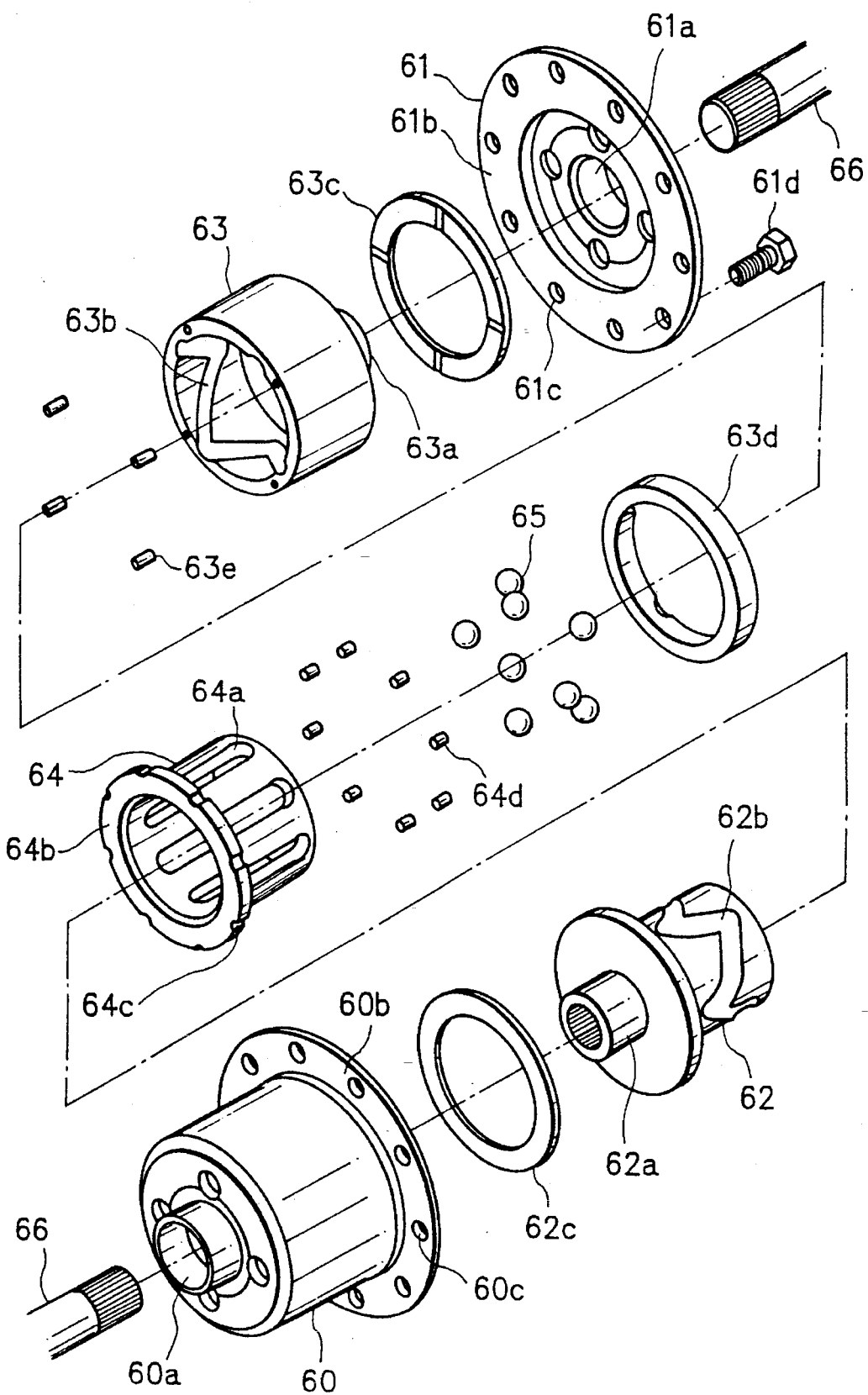
FIG. 25 is an exploded perspective view of the differential gear.

Referring further to some other exemplary embodiment of this invention, FIG. 23 through FIG. 26 show the seventh exemplary embodiment, FIG. 23 being a side sectional view of the differential gear of this exemplary embodiment, FIG. 24 showing the cross-section A—A of the drawing of FIG. 23 and FIG. 25 being an exploded perspective view of said differential gear.

The differential gear of this exemplary embodiment consists of a gear case 60, a gear case cover 61 which covers one end of said gear case 60, a pair of coaxially positioned ball discs 62 and 63, a ball holder 64 inserted between said ball discs 62 and 63 and multiple number of balls 65 being retained by said ball holder 64 for free rolling. Namely, respective ball discs 62 and 63 constitute the rotary members, said ball holder 64 constitutes the retainer and said balls 65 constitute the rolling elements, respectively.

Said gear case 60 is of a cylindrical shape with its one end opened and a bearing 60a to support one 62 of the ball discs is being provided around the axial center thereof. A flange 60b is provided around the periphery of said gear case 60 wherein multiple number of bolting holes 60c are being opened.

Said gear case cover 61 is of a disc-shape and a bearing 61a which suspends the other ball disc 63 is install to its center. A flange 61b is provided around the periphery of said gear case cover 61 wherein multiple number of bolting holes 61c are being opened. Namely, said gear case cover 61 is being attached to said gear case 1 by means of bolts 61d clamping said flanges 60b and 61b together.

One 62 of the two ball discs is of a cylindrical shape and one side of said ball disc 62 is being formed into a coupler structure 62a for connection with the drive shaft to the wheel. A groove 62b wherewith balls 65 engage for free rolling is provided in the peripheral surface of said ball disc 62 in continuation around the peripheral direction. FIG. 26 shows exploded views of said ball discs 62 and 63 on a flat plane wherein angle scales 0° through 360° represent the peripheral coordinates. Namely, as shown in FIG. 26, the groove 62 consists of first guide zones 62b-1 which work to move balls 65 from one side in the axial direction of said ball disc 62 toward the other side and second guide zones 62b-2 which work to move balls 65 from said other side in the axial direction of said ball disc 62 to the opposite side of said ball disc 62 in an alternate continuation, said second guide zones 62b-2 being made longer in the peripheral direction than said first guide zones 62b-1. Also, a thrust washer 62c is being inserted between the end plane of said ball disc 62 and said gear case 60.

The other ball disc 63 is also of a cylindrical shape and one side of said ball disc 63 is being formed into a coupler structure 63a for connection with the drive shaft 66 to the wheel. The bore diameter of said ball disc 63 is larger than the outer diameter of the other ball disc 62 and said other ball disc 62 is being inserted into the bore of said ball disc 63. In the bore surface of said ball disc 63, a groove 63b into which balls 65 engage for free rolling is provided in continuation in the peripheral direction. Said groove 63b consists of, similar to the groove of the other ball disc 62, first guide zones 63b-1 which work to move the balls from one side in the axial direction of said ball disc 63 toward the other side and second guide zones 63b-2 which work to move balls 65 from said other side of said ball disc 63 toward the opposite side in the axial direction of said ball disc 63 in an alternate continuation, said first guide zones 63b-1 is being made longer in the peripheral direction than said second guide zones 63b-2. Namely, on the outer and inner peripheral surfaces of said ball disc 62 and ball disc 63, when a set of direction changing points (left side or right side in the axial direction) of the grooves 62b and 63b meet together in radial direction, the other set of direction changing points deviates in position in the peripheral direction. Meanwhile, with this exemplary embodiment, although the grooves 62b and 63b are facing in the radial direction, their performance and effects are identical with the case of the aforementioned first exemplary embodiment wherein corresponding grooves are facing each other in the axial direction. Also, a thrust washer 63c is being inserted between the end plane of said ball disc 63 and the gear case 60. Moreover, a portion of said ball disc 63 is being divided in the axial direction and the annex 63d is being installed to said ball disc 63 by means of multiple number of pins 63e, such structure having been employed in order to facilitate machining of said groove 63c in the bore surface of said ball disc 63 and to allow insertion of balls between grooves 62b and 63a at the time of their assembly.

The ball holder 64 is of a cylindrical shape which is to be inserted between the two ball discs 62 and 63. In the peripheral surface of said ball holder 64, multiple number of slots 64a which house said balls 65 for free rolling are being provided at equal intervals in the peripheral direction, the longitude of said slots 64a being directed toward the axial direction of said ball holder 64 and said slots 64a being open through the radial direction of said ball holder 64. Namely, said slots 64a constitute the guide. A flange 64b is provided around the periphery of said ball holder 64 and said ball holder 64 is being attached inside the gear case 60 by means of multiple number of pins engaging into grooves 64c provided around the periphery of said flange 64b. Meanwhile, mating grooves 60e to engage with said pins 64d are also provided inside the gear case 60.

Balls 65 are housed inside slots 64a provided in said ball holder 64 in engagement with the grooves 62b and 63d of the ball discs 62 and 63, respectively.

With a differential gear of the aforesaid structure, when revolution difference occurs between the ball discs 62 and 63, balls 65 rolls about along the grooves 62b and 63b of respective ball discs 62 and 63 to make reciprocal movements inside the slots 64a provided in the ball holder 64. At this time, although every other ball, or one half of the total number of balls, reaches the direction changing point of either left or right end in the axial direction of respective grooves 62b and 63b, it is so designed that all the balls 65 may not reach the direction changing point of respective grooves 62b and 63b simultaneously, since the direction changing points at the other end in the axial direction of the groove 62b and those of the groove 63b are so made to deviate each other when the direction changing points at one end in the axial direction of the groove 62b and those of the groove 63b meet together. Also, when one of said ball discs 62 and 63 only is driven to rotate from the drive shaft 66 side, similar to the circumstances under the aforementioned first exemplary embodiment, the reaction force which said balls 65 receive from said grooves 62b and 63b works to restrict the revolution difference.

Meanwhile, although this exemplary embodiment adopted grooves 62b and 63b of similar structures to those of the aforementioned first exemplary embodiment, when grooves of similar structures to those of the aforementioned second or third exemplary embodiment were employed, similar performances and effects as with the second or third exemplary embodiment can be expected.

Figure 27:
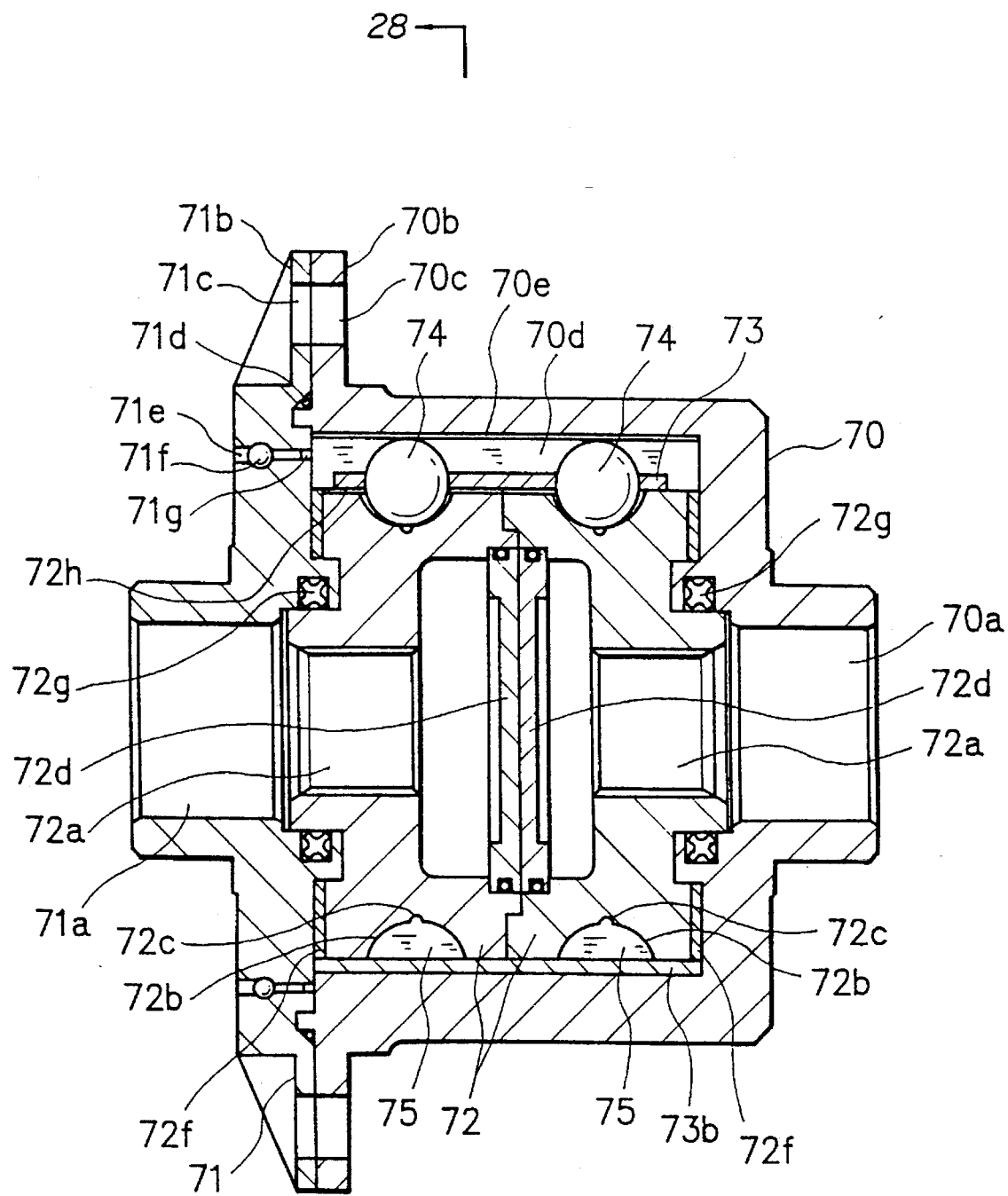
FIG. 27 is a side sectional view of the differential gear of the eighth exemplary embodiment of this invention.
Figure 28:
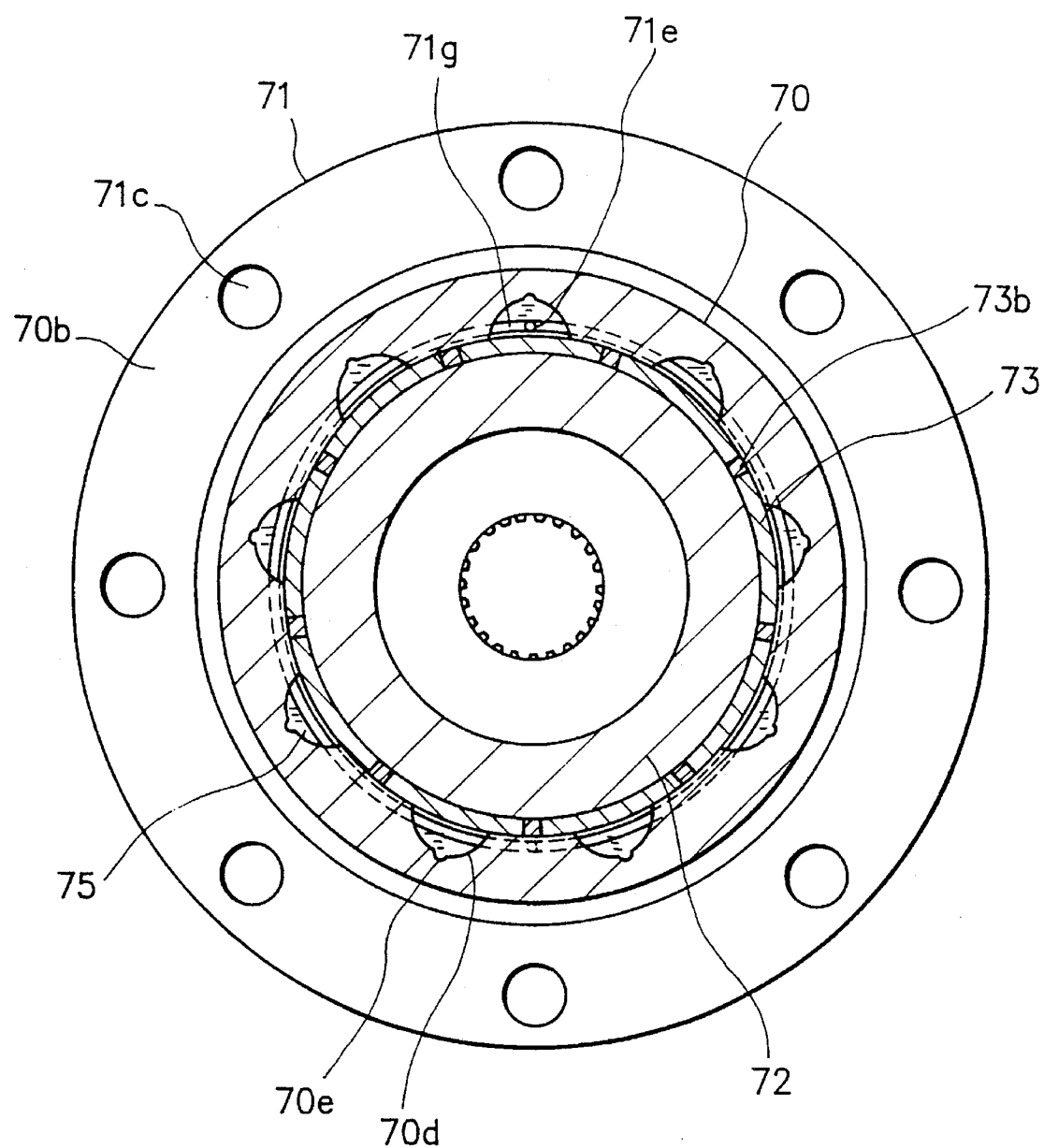
FIG. 28 shows the cross-section A—A of the drawing in FIG. 23.
Figure 29:
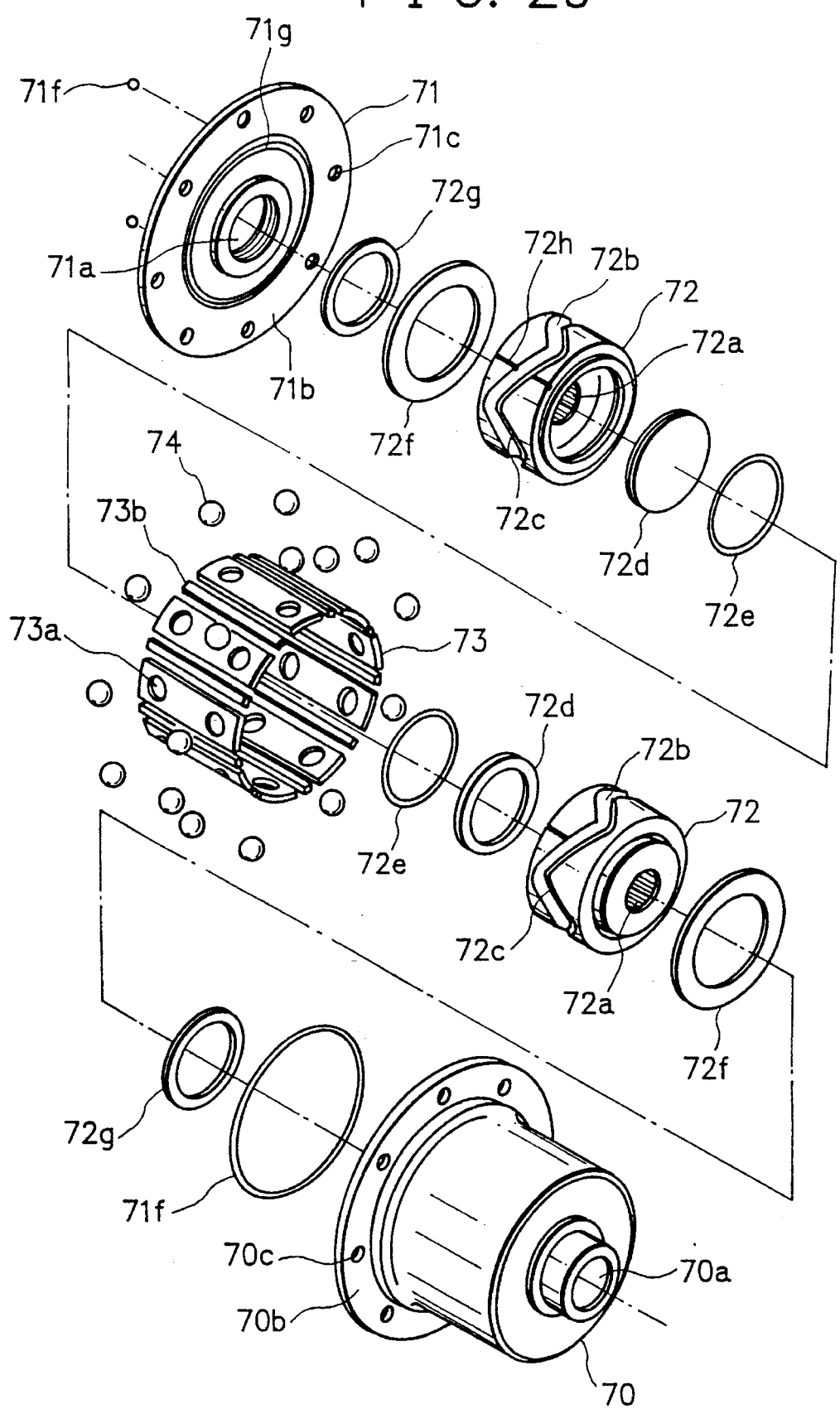
FIG. 29 is an exploded perspective view of the differential gear.

Referring further to some more exemplary embodiment of this invention, FIG. 27 through FIG. 30 show the eighth exemplary embodiment, FIG. 27 being a side sectional view of the differential gear of this exemplary embodiment, FIG. 28 showing cross-section A—A in the drawing of FIG. 27 and FIG. 29 being an exploded perspective view of the differential gear.

The differential gear of this exemplary embodiment consists of a gear case 70, a gear case cover 71 which covers one end of said gear case 70, a pair of coaxially positioned ball discs 72, a ball holder inserted between said pair of ball discs 72, multiple number of ball holders 73 spanning across the two ball discs 72 and multiple number of balls retained by said ball holders 73 for free rolling, the space where said balls 74 moves about inside the gear case 70 being filled by a viscous fluid 75.

Namely, said pair of ball discs 72 constitute the rotary member, said ball holders 73 constitute the retainer and said balls 74 constitute the rolling elements, respectively.

Said gear case 70 is of a cylindrical shape with its one end opened and a bearing 70a to support one of said ball discs 72 is being provided around the axial center thereof. A flange 70b is provided around the periphery of said gear case 70 wherein multiple number of bolting holes 70c are being opened. In the bore surface of said gear case 70, multiple number of grooves 70d into which said balls 74 engage are being provided, the longitude of said grooves 70d being directed toward the axial direction of said gear case 70 and being provided at equal intervals around the peripheral direction. Namely, said grooves 70d constitute the guide. Also, in said grooves 70d, into their bottoms, fluid conduits 70e are being formed which allow passage of the viscous fluid 75.

Said gear case cover 71 is of a disc shape and a bearing 71a to support the other ball disc 72 is being provided around the axial center of said gear case cover. A flange 71b is provided around the periphery of said gear case cover 71 wherein multiple number of bolting holes 71c are being opened. Namely, said gear case cover 71 is being attached to the gear case 70 by the bolts clamping said flanges 70b and 71b together via a sealing O-ring 71d. Also said gear case cover 71 is being provided with filling ports 71e through which the viscous fluid 75 is to be supplied, each filling port 71e being sealed by a ball after the viscous fluid 75 has been filled and said ball being clamped by smashing in the surrounds of said filling port 71e. Meanwhile, said filling ports 71e are being provided at total two places or more for fluid supply and for air bleeding. Also, around the internal surface of said gear case cover 71, a circular groove 71g is provided which works to disperse the supplied viscous fluid throughout the periphery of the bore of said gear case 70, said circular groove 71g connecting to said filling ports 71e.

Figure 30:
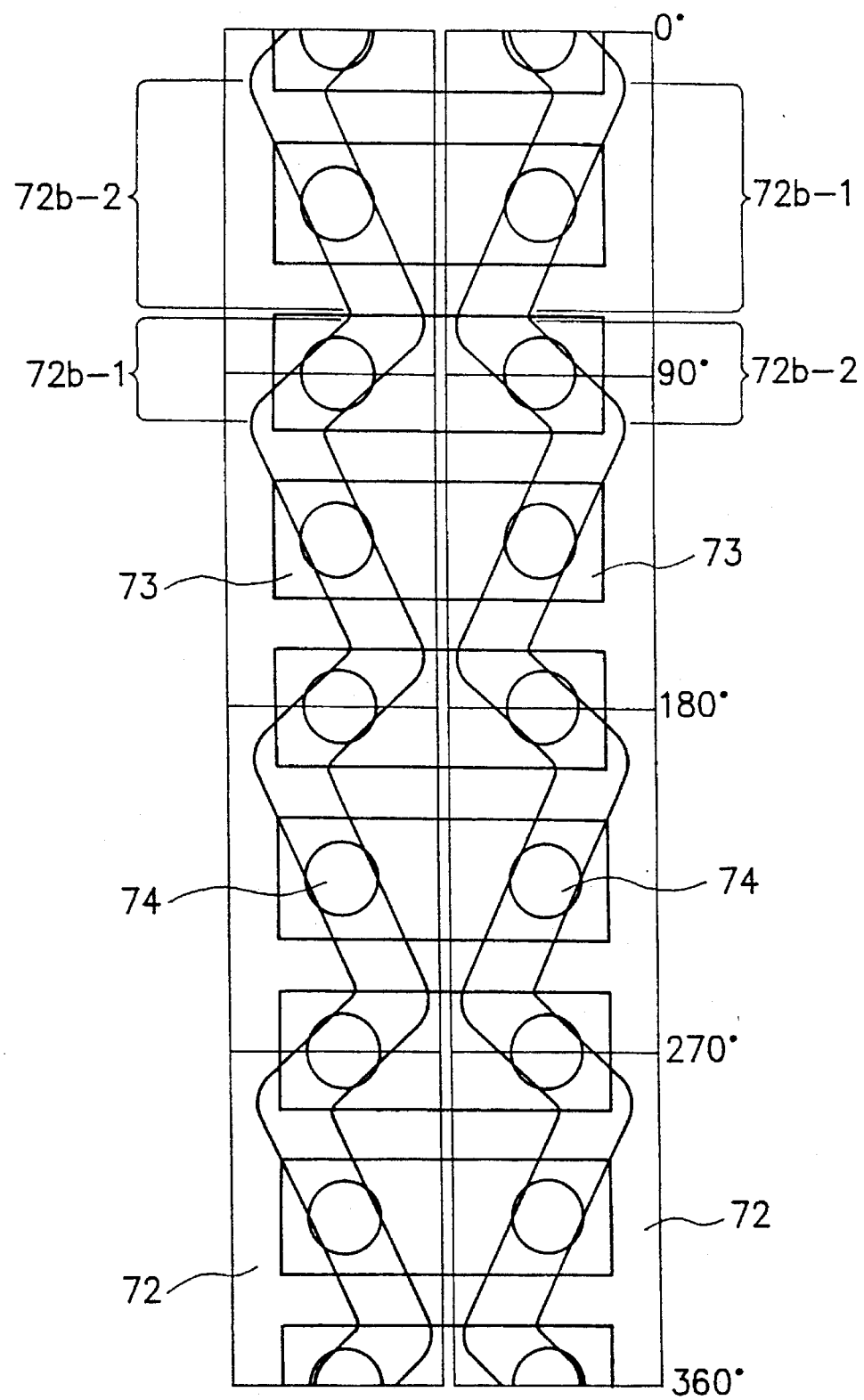
FIG. 30 is an explanatory exploded view of the grooves on a plain surface.

The two ball discs 72 are of a hollow structure and one side of said ball disc is being formed into a coupler structure 72a for connection with the drive shaft to the wheel. The two ball discs 72 are of equal outer diameter being put together on their mating surfaces for free individual rotations. On the peripheral surface of each ball disc 72, a groove 72b into which balls 74 engage for free rolling is provided in continuation in the peripheral direction. FIG. 30 shows exploded views of said ball discs 72 on a flat plane wherein angle scales 0° through 360° represent the peripheral coordinates. Namely, each groove 72b consists of first guide zones 72b-1 which work to move the balls 74 to one side in the axial direction of said ball disc 72 toward the other side and second guide zones 72b-2 which work to move balls from said other side of said ball disc 72 toward the opposite side in the axial direction of said ball disc 72 in an alternate continuation, said first guide zones 72b-1 being made longer than said second guide zones 72b-2 with one of the two ball discs 72 and said second guide zones 72b-2 being made longer than said first guide zones 72b-1 with the other ball disc 72. Namely, similar to the aforementioned seventh exemplary embodiment, when the direction changing points at one end in the axial direction of the two grooves 72b meet in the peripheral direction, the direction changing points at the other ends of respective grooves 72b are so designed to deviate between the two grooves 72b. Also, in said grooves 72b, into their bottoms, fluid conduits 72c are being formed which allow passage of the viscous fluid 75. The mutually facing surfaces of the two ball discs 72 are provided with disc caps 72d which work to close the hollow space thereof and sealing O-rings 72a are being inserted between the peripheral surfaces of said disc caps 72d and said ball disc 72. Also, thrust washers 72f are being provided between the end surface of one of the two ball discs 72 and the gear case 70 and between the end surface and the gear case cover 71, while oil seals 72g are inserted between the coupler structures 72a of the two ball discs and bearings 70a and 71a for sealing. Moreover, plural numbers of fluid conduits 72h are provided in the peripheral surface of each ball disc 72 which connects the groove 72b and open at both ends of said ball disc 72 to let the viscous fluid 75 having been supplied through the filling ports 71e provided in the gear case cover 71 fed into and fill the space of said groove 72b.

The ball holders 73 are being positioned between each ball disc 72 and the gear case 70 spanning across the peripheral surfaces of the two ball discs 72. Each ball holder 73 is provided with two holes 73a to sustain one ball 74 each for one of the two ball discs 72 and for the other ball disc 72 to let two balls 74 engaging with the two grooves 72b of the two ball discs 72 move reciprocally in the axial direction of each ball holder 73 maintaining the prescribed distance between said two balls 74. Also, a spacer 73b is being provided between every two ball holders 73 and the grooves 70d in said gear case 70 and the grooves 72b of said two ball discs are being covered by said ball holders 73 and said spacers 73b, all around.

Balls 74 are being housed in said holes 73a of said ball holders 73 and engaging with the grooves 70d of said gear case 70 and the grooves 72b of the two ball discs 72.

Said viscous fluid 75 consists of silicon oil or a similar substance and filling the space inside said gear case 70, including the space of said grooves 72b of the two ball discs 72, namely space being enclosed by oil seals 72g.

With a differential gear of the aforesaid structure, when revolution difference occurs between the two ball discs 72, balls 74 rolls about along said grooves 72b of said ball discs 72 to make reciprocating movement together with their ball holders 73 in the axial direction of said ball discs 72.

At this time, when on one the two ball discs 72 only is driven to rotate from the drive shaft side, similar to the circumstances under the aforementioned first exemplary embodiment, the reaction force which balls 74 receive from said grooves 72b works to restrict the revolution difference. Also, when the revolution difference between the two ball discs 72 expands larger, resistance of said viscous fluid 75 against said balls 74 increases and said resistance also works to restrict the revolution difference. Namely, when balls 74 roll along said grooves 70d and 72b being enclosed by all the ball holders 73 and spacers 73b, said viscous fluid 75 flows through the fluid conduits 70e and 72c provided in said grooves 70d and 72b, the flowing resistance at the time of said viscous fluid 75 also works to restrict the revolution difference. In this case, the revolution difference restricting effect becomes larger corresponding to the revolution difference between the two ball discs 72.

Consequently, with the differential gear of this exemplary embodiment, revolution-sensitive revolution difference restricting effect occurring from the resistance of the viscous fluid 75 against balls 74 can be obtained in addition to the torque-sensitive revolution difference restricting effect being derived from the reaction force the balls 74 receive from the grooves 72b, always reliable revolution difference restriction can be expected for all the travelling modes of a vehicle, similar to the circumstances under the aforementioned second exemplary embodiment of this invention.

Meanwhile, although this exemplary embodiment adopted the grooves 72b of a similar structure to those of the aforementioned first exemplary embodiment, when grooves of similar structures to those of the aforementioned second or third exemplary embodiment were adopted, similar performances and effects as with the second or third exemplary embodiment can be expected.

The aforesaid structure wherewith the sealed space is being filled by the viscous fluid similar to the structure of this exemplary embodiment may also be adopted for the aforementioned seventh exemplary embodiment.

Meanwhile, although descriptions of all the aforementioned exemplary embodiments have been based on applications to differential gears of vehicles, this invention can also be widely applied to many other machines as their torque transmission equipment. In particular, since the third exemplary embodiment is being equipped with functions of effective reduction gears under a very simple structure, not only for applications as various speed reducers, it should also be very suitable for application to the rotary mechanism for the manipulator joints of industrial robots.

I claim:

1. A differential gear characterized by a structure comprising, a pair of coaxially positioned rotary members facing each other in the axial direction, a casing to house said rotary members, multiple number of rolling elements inserted between two surfaces facing each other in the axial direction of said pair of rotary members and a retainer which works to retain said rolling elements in position between said two rotary members, said retainer being provided with multiple number of guide slots with their longitudes being directed radially, forming through openings, in the axial direction of said rotary members, through all the thickness of said retainer for free rolling of said rolling elements, said rotary members being provided with grooves, which engage with said rolling elements on their surfaces facing each other in the axial direction in continuation in the peripheral direction and said grooves being so designed that, when revolution difference occurs between said two rotary members, said rolling elements make reciprocal movement along said guide slots.

2. A differential gear according to the aforementioned claim 1, but characterized by a structure wherewith space inside said casing or at least the space where said rolling elements roll about is filled by a viscous fluid.

3. A differential gear according to the aforementioned claim 2, but characterized by a structure wherewith at least either one of said guide slots and grooves are provided with clearance allowing flow beyond said rolling elements of said viscous fluid.

4. A differential gear according to the aforementioned claim 1, but characterized by a structure wherewith said grooves of said rotary members consisting of first guide zones which work to move said rolling elements from one side of said guide slots toward the other side thereof and second guide zones which work to move said rolling elements from said other side of said guide slots toward the opposite side thereof in an alternate continuation in the peripheral direction, said first guide zones of one of said pair of rotary members being made longer than said second guide zones thereof and said second guide zones of the other rotary member being made longer than said first guide zones thereof.

5. A differential gear according to the aforementioned claim 4, but characterized by a structure wherewith the contact angle between said grooves and said rolling elements in the radial directions of said rotary members being so determined that, even if the distances between the axis of respective rotary member and respective rolling elements change, the magnitude of the reaction force said grooves receive from said rolling elements remains always constant.

6. A differential gear according to the aforementioned claim 4, but characterized by a structure wherewith the contact angle between said grooves and rolling elements in the axial direction of said rotary members being so determined that, even if the distances between the axis of respective rotary member and respective rolling elements change, the magnitude of the reaction force said grooves receiver from said rolling elements remains always constant.

7. A differential gear according to the aforementioned claim 1, but characterized by a structure wherewith said grooves of said rotary members consisting of first guide zones which work to move said rolling elements from one side of said guide slots toward the other side thereof, second guide zones which work to move said rotary members from said other side of said guide slots toward the opposite side thereof and the third guide zones which work to keep said rolling elements within prescribed range of said guide slots in an alternate continuation in the peripheral direction, being so designed that the degree of contacts with said rolling elements within said first guide zones and within said second guide zones remains the same, while providing said third guide zones within the range of said first guide zones with one of said pair of rotary members and providing said third guide zones within the range of said second guide zones with the other rotary member.

8. A differential gear according to the aforementioned claim 1, but characterized by a structure wherewith said grooves of said rotary members consisting of first guide zones which work to move said rolling elements from one side of said guide slots toward the other side thereof and second guide zones which work to move said rolling elements from said other side of said guide slots toward the opposite side thereof in an alternate continuation in the peripheral direction, with the number of the first guide zones or second guide zones of one of said pair of rotary members differing from the number of the first guide zones or second guide zones of the other rotary member.

9. A differential gear according to the aforementioned claim 8, but characterized by a structure wherewith the total sum of the number of the first guide zones or second guide zones of one of said pair of rotary members and the number of the first guide zones or second guide zones of the other rotary member coincides with the total number of rolling elements.

10. A differential gear according to the aforementioned claim 9, but characterized by a structure consisting of at least three coaxially positioned rotary members and at least two retainers provided one each between two adjacent rotary members.

11. A differential gear characterized by a structure comprising, a pair of coaxially positioned rotary members facing each other in the axial direction, a casing to house said rotary members, multiple number of rolling elements inserted between the two surfaces facing each other in the radial directions of said pair of rotary members and multiple number of retainers which work to retain one each of said rolling elements on one rotary member and on the other rotary member simultaneously in position and for simultaneous free rolling, a bore surface of said casing being provided with multiple number of guide grooves with their longitudes directed in the axial direction of said rotary members and said guide grooves being engaged with said rolling elements for free rolling, said rotary members being provided with grooves, which engage with said rolling elements, on their surfaces facing the bore surface of said casing in continuation in the peripheral direction of said rotary members and said grooves so designed that, when revolution difference occurs between said pair of rotary members, said retainers and said rolling elements make reciprocal movement along said guide grooves provided in the bore surface of said casing.

* * * * *

UNITED STATES PATENT AND TRADEMARK OFFICE
CERTIFICATE OF CORRECTION

PATENT NO.   :   5,577,423
DATED         :   Nov. 26, 1996
INVENTOR(S) :   Kenji MIMURA It is certified that error appears in the above-indentified patent and that said Letters Patent is hereby corrected as shown below:

Col. 3, line 27, change "A-A" to --2-2--.

Col. 4, line 1, change "A-A" to --20-20--;

line 10, change "A-A" to --24-24--;

line 19, change "A-A" to --28-28--;

line 20, change "23" to --27--.

Signed and Sealed this

Third Day of June, 1997

Attest:

BRUCE LEHMAN

Attesting Officer     Commissioner of Patents and Trademarks